(12) United States Patent
Sakamoto et al.

(10) Patent No.: US 7,832,519 B2
(45) Date of Patent: Nov. 16, 2010

(54) FRAME STRUCTURE FOR WORKING VEHICLE

(75) Inventors: Kunihiko Sakamoto, Chikugo (JP);
Kouichi Takata, Chikugo (JP);
Nagahiro Ogata, Chikugo (JP);
Yousuke Yamashita, Chikugo (JP);
Makiko Tajima, Chikugo (JP); Hiroaki Ayabe, Chikugo (JP)

(73) Assignee: Yanmar Co., Ltd., Osaka-shi, Osaka (JP)

( * ) Notice: Subject to any disclaimer, the term of this patent is extended or adjusted under 35 U.S.C. 154(b) by 183 days.

(21) Appl. No.: 12/090,846

(22) PCT Filed: Jan. 23, 2006

(86) PCT No.: PCT/JP2006/300954

§ 371 (c)(1),
(2), (4) Date: May 28, 2008

(87) PCT Pub. No.: WO2007/046156

PCT Pub. Date: Apr. 26, 2007

(65) Prior Publication Data

US 2009/0121521 A1      May 14, 2009

(30) Foreign Application Priority Data

Oct. 19, 2005   (JP)   ............................ 2005-305075

(51) Int. Cl.
*B62D 21/02* (2006.01)
*B60K 17/00* (2006.01)
(52) U.S. Cl. ........................ 180/312; 180/377; 280/800; 280/781; 280/797; 280/798; 280/760; 296/205
(58) Field of Classification Search ................. 280/800, 280/781, 797, 798, 799, 760; 180/312, 311, 180/352, 344, 377; 296/204, 205, 203.01
See application file for complete search history.

(56) References Cited

U.S. PATENT DOCUMENTS 1,848,895 A * 3/1932 MacPherson ................ 280/800
2,022,099 A * 11/1935 Wolfram et al. ............. 180/292

(Continued)

FOREIGN PATENT DOCUMENTS

| JP | 5-221339 | 8/1993 |
| JP | 6-270839 | 9/1994 |
| JP | 2003-129512 | 5/2003 |
| JP | 2004-1769 | 1/2004 |
| JP | 2005-271833 | 10/2005 |

OTHER PUBLICATIONS

International Search Report for International Application No. PCT/JP2006/300942, Japanese Patent Office, mailed Apr. 25, 2006, 2 pgs.
Patent Abstracts of Japan, abstract of Publication No. JP 05-221339, Front Axle Frame of Tractor, published Aug. 31, 1993.

(Continued)

*Primary Examiner*—Ruth Ilan
*Assistant Examiner*—Keith Frisby
(74) *Attorney, Agent, or Firm*—Sterne, Kessler, Goldstein & Fox P.L.L.C.

(57) ABSTRACT

Rigidity of a frame of a working vehicle is improved by a simple structure and production costs are reduced by reducing the number of parts of a working vehicle. Pipes 66 are provided on both left and right sides at the center in the front-rear direction of a side frame 62, and each pipe 66 has a rectangular cross-section and penetrates an intermediate partition in the front-rear direction from a mast section 64 up to a transmission section. Tie-down holes are formed in a front face plate 61 to which the front end of a frame 9 is connected, and a plate 64b connected to a side frame 62 is provided at the bottom surface of each mast section 64 protruding outward from the side frame 62. Tanks installed on the working vehicle are suspended from the plate bodies 64b, and a lift arm installation boss provided at each mast section 64 is supported at both ends. A U-shaped reinforcement member 81 connects the upper surface of mast partition plate of a mast section 64 and left and right bosses.

13 Claims, 27 Drawing Sheets

U.S. PATENT DOCUMENTS

| | | | | |
|---|---|---|---|---|
| 2,299,900 | A | * | 10/1942 | Jackson ............... 280/124.107 |
| 2,507,845 | A | * | 5/1950 | Ziegler ....................... 280/796 |
| 6,098,870 | A | * | 8/2000 | Deneve et al. .............. 228/182 |
| 6,237,957 | B1 | * | 5/2001 | Takekata et al. ............ 280/781 |
| 6,722,729 | B2 | * | 4/2004 | Yoshida et al. ......... 296/187.09 |
| 7,036,622 | B2 | * | 5/2006 | Iwaki ........................ 180/311 |

OTHER PUBLICATIONS

Patent Abstracts of Japan, abstract of Publication No. JP 06-270839, Under-Carriage Frame for Truck or the Like, published Sep. 27, 1994.

Patent Abstracts of Japan, abstract of Publication No. JP 2003-129512, Tractor Attached Back Hoe, published May 8, 2003.

Patent Abstracts of Japan, abstract of Publication No. JP 2004-001769, Axle-Chassis Connecting Structure for Working Vehicle, published Jan. 8, 2004.

Patent Abstracts of Japan, abstract of Publication No. JP 2005-271833, Revolving Frame Structure of Upper Part Revolving Body, published Oct. 6, 2005.

* cited by examiner

Fig. 21
(a)
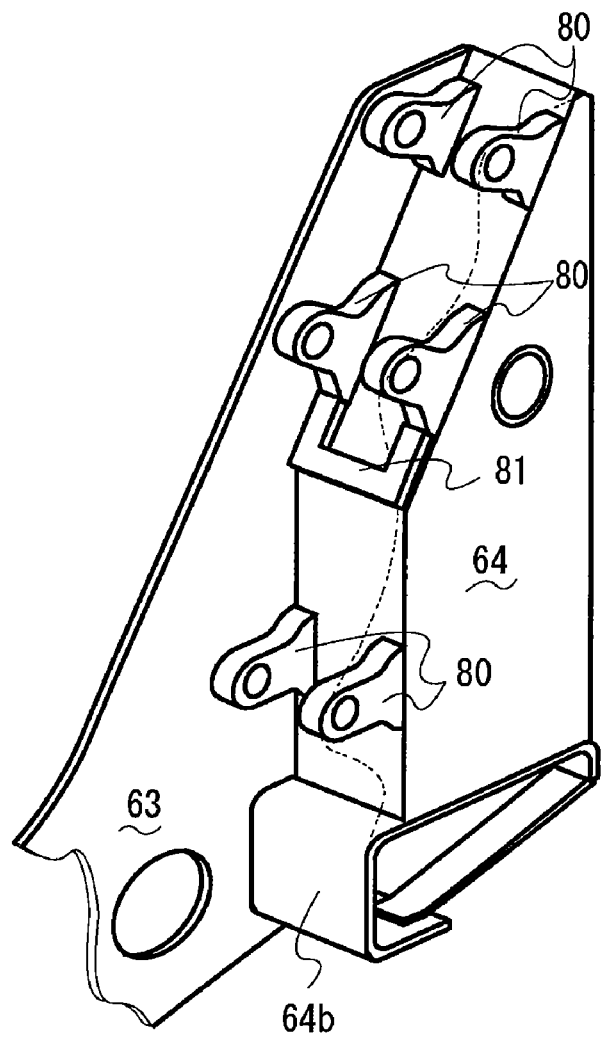
(b)
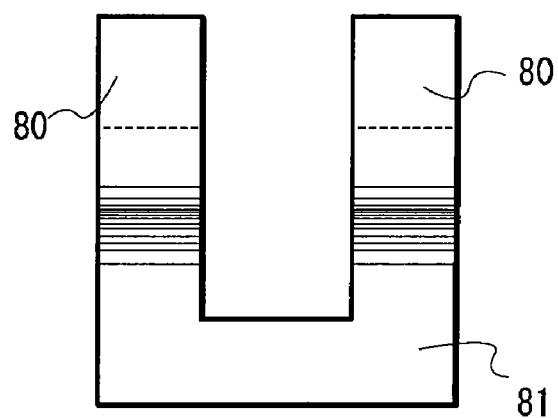

FRAME STRUCTURE FOR WORKING VEHICLE

BACKGROUND OF THE INVENTION

1. Field of the Invention

The present invention relates to a frame structure for a working vehicle. In more detail, the present invention relates to an easy and cheap construction of light and rigid frame of a working vehicle.

2. Background Art

Conventionally, there is well known a frame of a working vehicle constructed by square pipes, I-shaped steel and the like. The frame of the working vehicle is constructed by I-shaped steel and the like, and various devices are attached to the frame as needed (for example, see the Patent Literature 1).

A frame mainly comprising square pipes and I-shaped steel is difficult to be processed so as to require prodigious labor for assembly. Furthermore, high cost is required for production.

Patent Literature 1: the Japanese Patent Laid Open Gazette 2004-1769

BRIEF SUMMARY OF THE INVENTION

Problems to Be Solved by the Invention

The purpose of the present invention is to improve the rigidity of a frame of a working vehicle and allowing for easy construction and reduced production cost.

When a stay is disposed in each of members for attachment, the number of parts is increased so as to reduce assembly workability. Further, attaching of many members increases weight. These are also problems to be solved.

Means for Solving the Problems

The above-mentioned problems are solved by the following means.

According to the present invention, with regard to a frame structure for a working vehicle including a cross member partitioning an engine disposition part and a transmission attachment part between left and right side frames, and a longitudinal pipe penetrating the cross member is disposed on an inner side surface of each of the side frames from the engine disposition part to the transmission attachment part.

A reinforcement member is disposed on a lower surface of each of the side frames from the engine disposition part to the transmission attachment part.

A mast section extended outward is disposed in an upper portion of each of the side frames respectively, and a plate body which connects a bottom surface of the mast section to a side surface of the side frame is provided.

Each of the mast sections is connected through a mast partition plate to an outer side of corresponding one of front frames respectively touching and fixed to the side frames, and the mast partition plate is fixed thereto with a pair of left and right bosses, which supports both sides of a lift arm, and a U-like reinforcement member connected to the left and right bosses.

An inner side surface of each of the mast sections and an upper surface of corresponding one of the side frames are connected to each other by a reinforce plate.

A mount of a radiator is disposed between the side frames and a connection member is provided which connects an upper portion of the mount to the reinforce plate.

The connection member is constructed integrally with a slide guide of a stay of an engine bonnet.

A base of a seat mount is connected to the upper surfaces of the left and right side frames so as to constitute a second cross member.

A transmission attachment member is disposed on the inner side surface of each of the side frames at the transmission attachment part, and a reinforcement member substantially triangle shaped when viewed on the side is fixed along a bent part of the lower surface of each of the side frames between the transmission attachment member to the cross member.

Each of the transmission attachment members is a laterally turned U-like shape when viewed in plan, and each of rear transaxle casings respectively extended leftward and rightward from the transmission is fixed to a plate member attached to a lower portion of the transmission attachment member.

An outer end of each of the rear transaxle casings is connected to a side surface of corresponding one of the side frames through a second plate member.

A plate body that is L-like shaped when viewed in front is extended from each of the side frames at the transmission attachment part, and the transmission is fixed through the plate bodies extended from the left and right side frames.

A lever stand attached to at least one of the left and right side frames serves as a stay of a rear fender.

A hydraulic valve connected to a lever disposed in the lever stand and main electric equipments are intensively attached to the lever stand so as to construct them integrally, whereby the number of parts of the working vehicle is reduced so as to improve workability of the assembly process and to simplify the checking and attachment of the electric equipments.

Effect of the Invention

According to the frame structure for the working vehicle of the present invention, rigidity of the frame is improved so that intensity of the frame of the working vehicle is improved. Parts requiring high rigidity are reinforced efficiently. The frame is reinforced efficiently with easy construction.

According to the frame structure for the working vehicle of the present invention, rigidity of the mast section is improved so that intensity of the frame of the working vehicle is improved. The frame of the working vehicle is rigid enough to bear when a working machine such as a backhoe is attached to the rear portion of the frame. The part requiring high rigidity is reinforced efficiently so as to make the mast section supporting a front loader light and having high load capacity. The inner side of the mast is circular arc-shaped so as to lighten stress.

According to the frame structure for the working vehicle of the present invention, support rigidity of the radiator mount is improved so that silence of an engine room is improved. Cost is reduced, and space in the engine room is saved.

According to the frame structure for the working vehicle of the present invention, bolts for attachment of the rear transaxle are screwed easily so that assembly workability of the working vehicle is improved. Attachment of the rear transaxle is simplified, and excessive load to the rear transaxle and the frame of the working vehicle is suppressed by transformation of the plate body.

According to the frame structure for the working vehicle of the present invention, attachment of the transmission is simplified, and excessive load to the frame of the working vehicle is suppressed by transformation of the plate body.

According to the frame structure for the working vehicle of the present invention, the number of parts of the working vehicle is reduced so as to improve workability of assembly process.

BRIEF DESCRIPTION OF THE DRAWINGS/FIGURES

FIG. 21 is a drawing of reinforcement construction of bosses.

DETAILED DESCRIPTION OF THE INVENTION

The present invention provides a light and rigid frame of a working vehicle by using a reinforcement member.

[Entire Construction]

Explanation will be given to a working vehicle that is an embodiment of the present invention.

Figure 1:
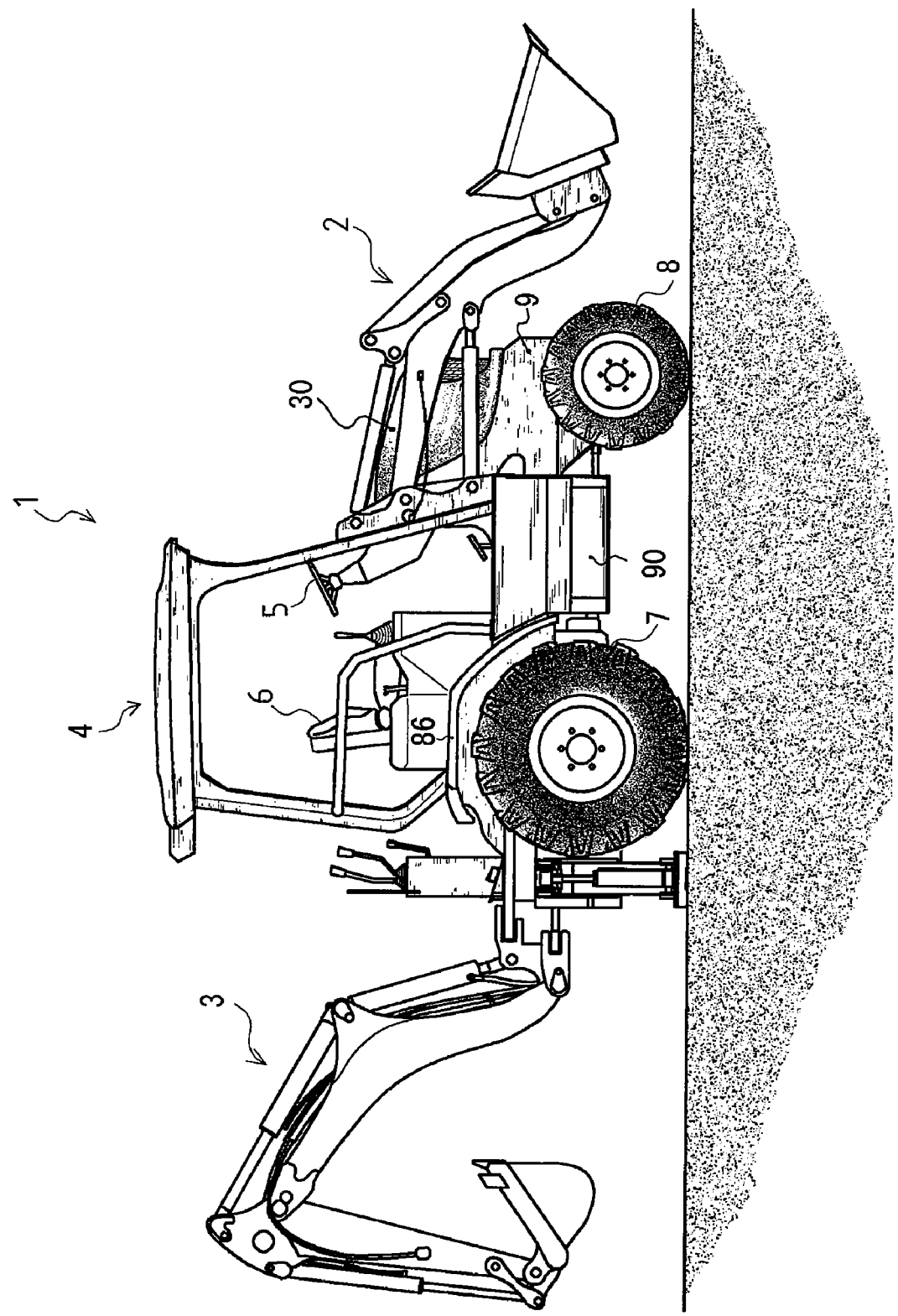
FIG. 1 is an entire side view of a working vehicle.

FIG. 1 is an entire side view of the working vehicle.

The working vehicle 1 is a tractor loader backhoe and is equipped with a loader 2 and an excavator 3. An operation part 4 is provided at the center of the working vehicle 1. The loader 2 is disposed before the operation part 4 and the excavator 3 is disposed behind the operation part 4. The working vehicle 1 is equipped with front wheels 8 and rear wheels 7 so as to travel while equipped with the loader 2 and the excavator 3.

A steering wheel 5 and a seat 6 are disposed in the operation part 4, and a traveling operating device and an operating device of the loader 2 are disposed at the side of the seat 6. Accordingly, steering operation of the working vehicle 1 and the operation of the loader 2 is performed at the operation part 4.

The loader 2 is connected to the working vehicle 1 and extended forward from the working vehicle 1. A bucket is attached to the tip of the loader 2. An engine is disposed on a front portion of a frame structure 9 which is a chassis of the working vehicle 1, and a bonnet 30 is disposed on the frame structure 9 to cover the engine.

The loader 2 is disposed outside the bonnet 30.

The excavator 3 is detachably attached to the rear portion of the working vehicle 1, and the excavator 3 is operated by an operating device disposed behind the seat 6.

A hydraulic oil tank 90 is disposed at the side of the operation part 4. The hydraulic oil tank 90 also serves as a step to the operation part 4. At the opposite side of the operation part 4, stairs constructed by a fuel tank is provided.

[Frame Construction]

Next, explanation will be given on frame construction of the working vehicle 1.

Figure 2:
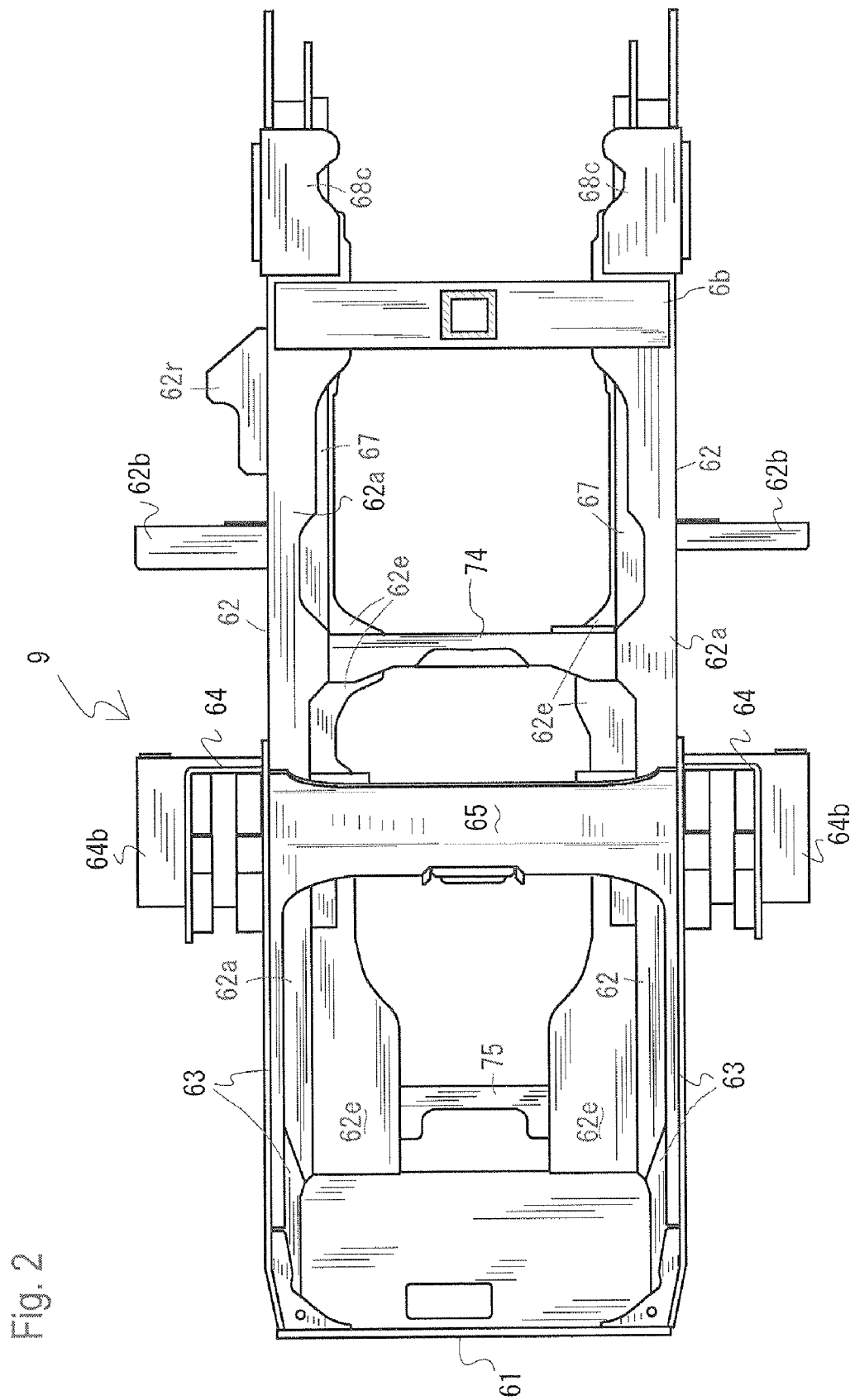
FIG. 2 is a plan view of a frame of the working vehicle.

FIG. 2 is a plan view of a frame of the working vehicle.

Figure 3:
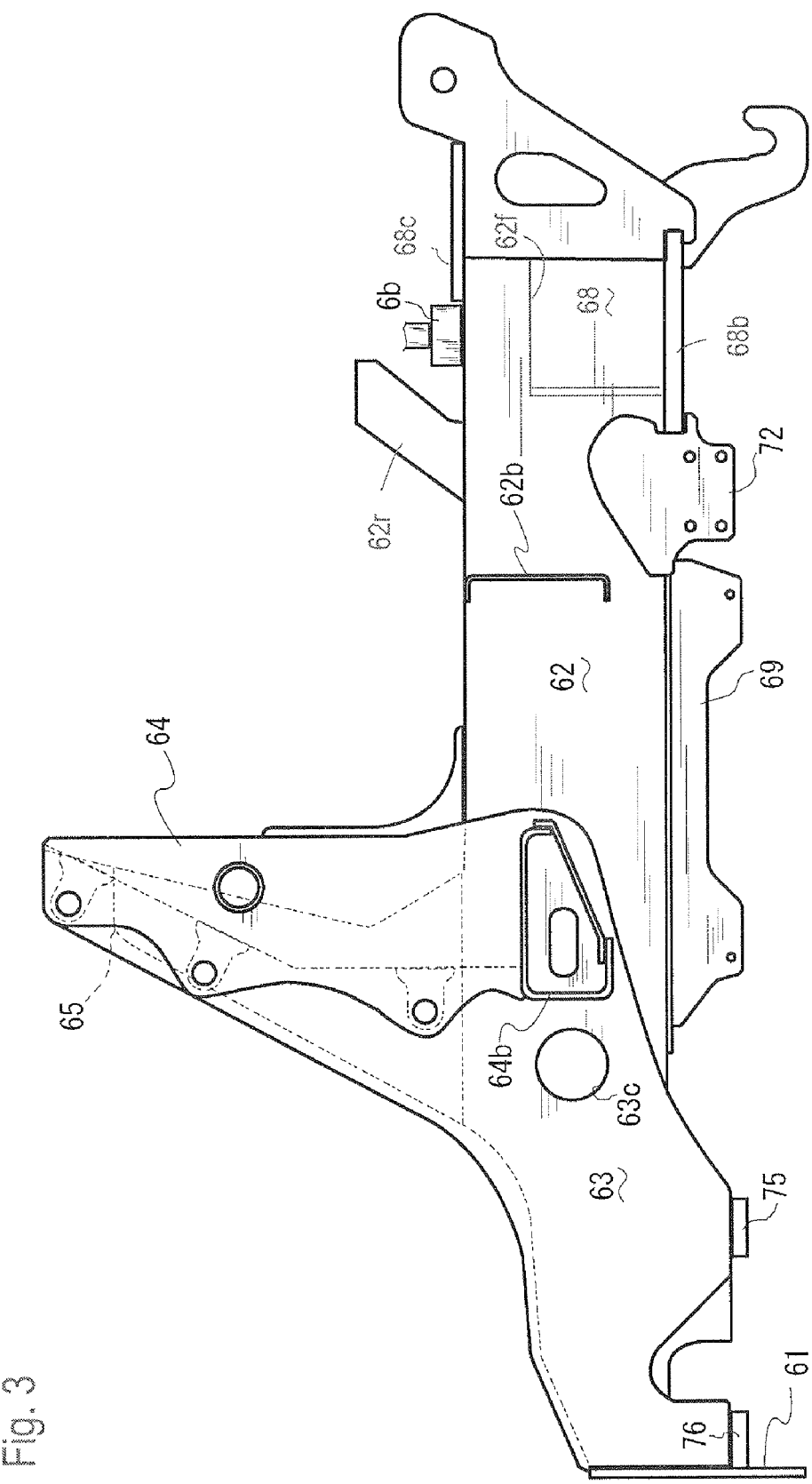
FIG. 3 is a side view of the same.

FIG. 3 is a side view of the same.

Figure 4:
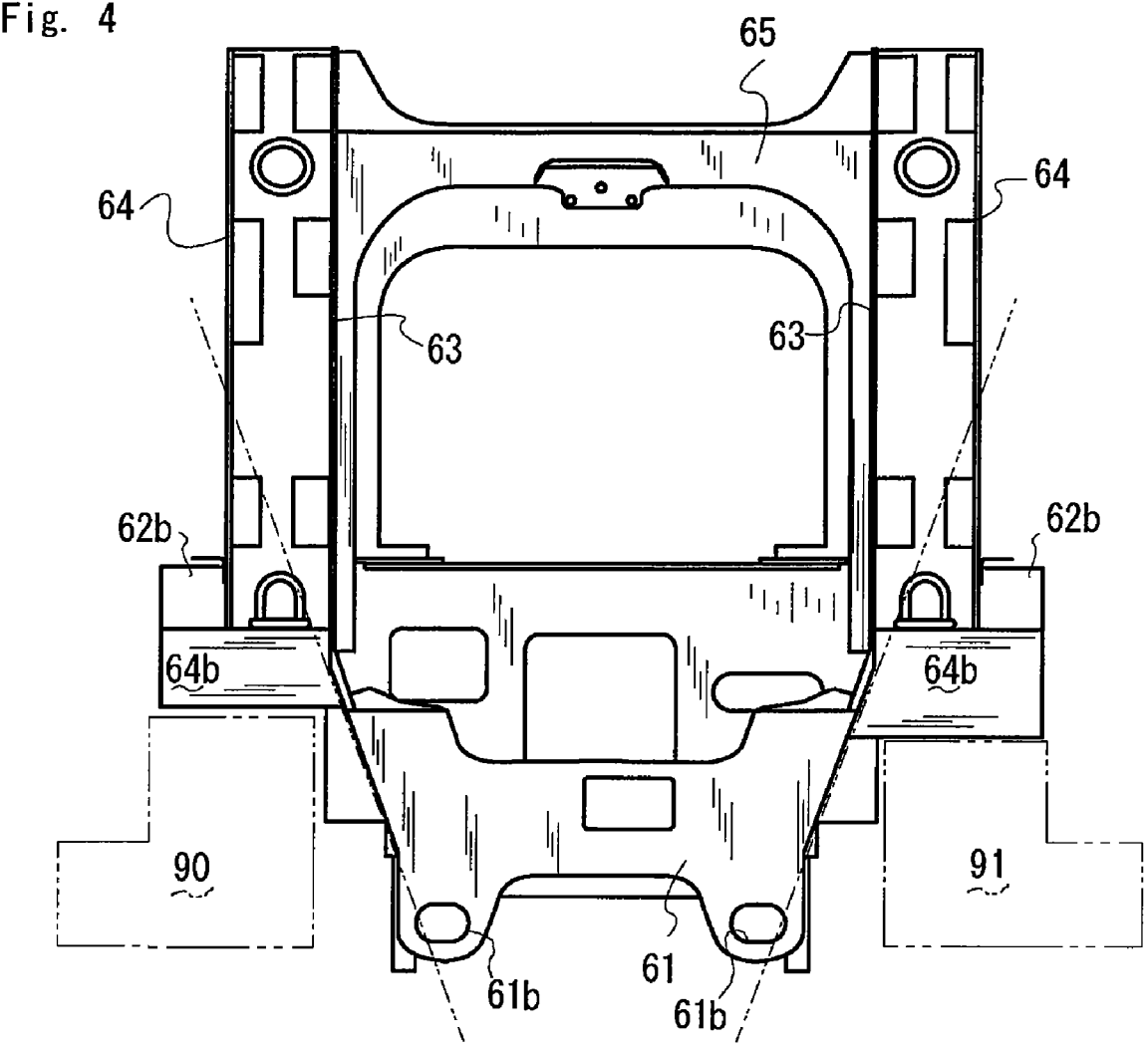
FIG. 4 is a front view of the same.

FIG. 4 is a front view of the same.

Figure 5:
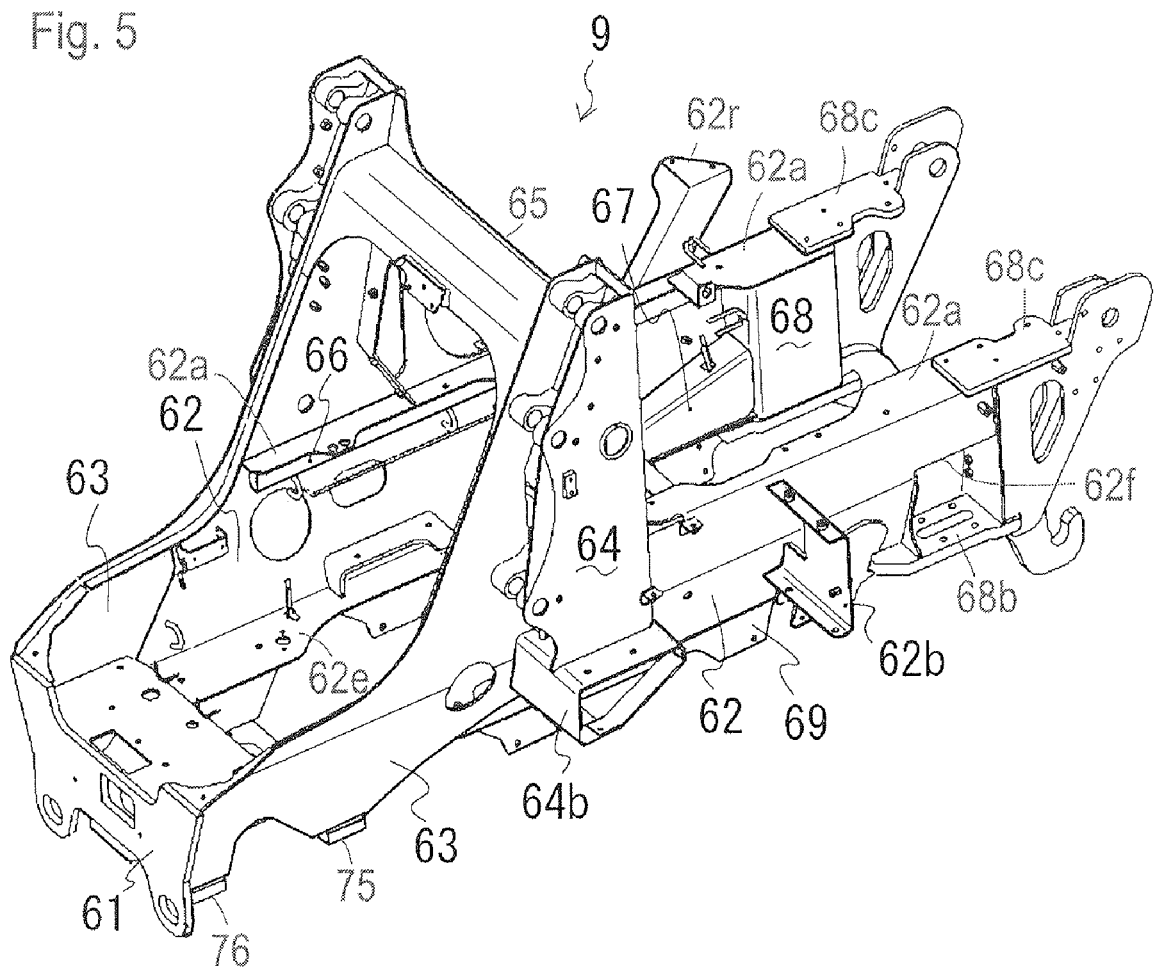
FIG. 5 is a perspective upper front view of the frame of the working vehicle.

FIG. 5 is a perspective upper front view of the frame of the working vehicle.

Figure 6:
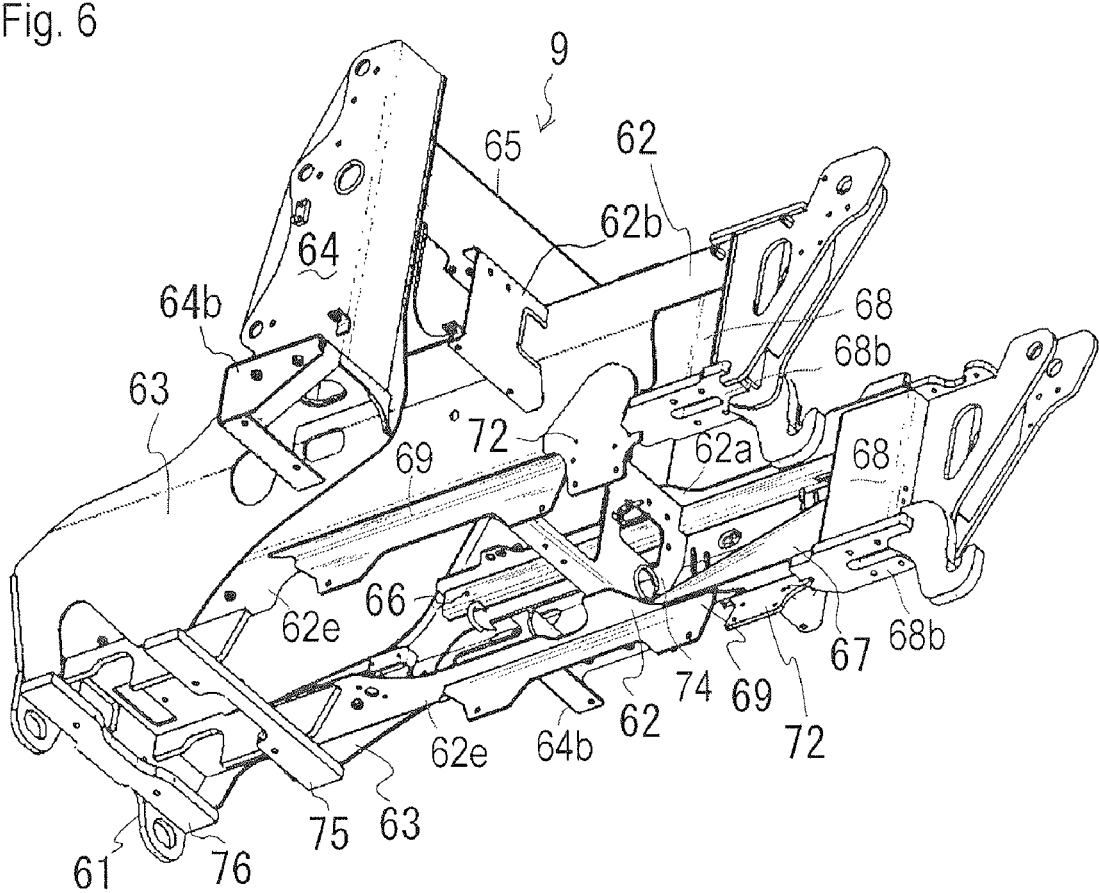
FIG. 6 is a perspective lower rear view of the frame of the working vehicle.

FIG. 6 is a perspective lower rear view of the frame of the working vehicle.

The frame structure 9 of the working vehicle 1 mainly comprises left and right side frames 62 extended longitudinally and adjoining laterally to each other, front frames 63 connected to the front portions of the respective side frames 62, and a front plate 61 connecting the front portions of the front frames 63 to each other. A mast section 64 is constructed on the outer side surface of each of the front frames 63. A rib 65 connects the front frames 63 to each other.

A middle partition 74 is disposed between the side frames 62 so as to connect the side frames 62 to each other, thereby making the ladder-like frame structure 9. The middle partition 74 is a cross member partitioning an engine space between the side frames 62 and a transmission space between the side frames 62 from each other, and is disposed at the substantially longitudinal center of the frame structure 9.

A beam 62b is extended outward from the side frames 62. The beam 62b is extended laterally and substantially perpendicular to the side frames 62. The beam 62b is C-like shaped when viewed in section and supports a floor part of the operation part 4.

Each of the front frames 63 is extended rearward upward so as to define the lower front portion of the frame structure 9.

Each of the front frames 63 is extended upward from its part connected to the corresponding side frame 62, and the upward extended part of the front frame 63 is attached to the corresponding mast section 64. The engine and the bonnet 30 are disposed in the engine space between the front frames 63. A lift mechanism of the loader 2 is connected to the mast sections 64, so that the loader 2 is supported by the mast sections 64.

A mast lower section 64b which is a lower portion of the mast section 64 is constructed by a member projected sideward. The mast lower section 64b is constructed by bending a plate body and substantially laterally turned L-like shaped or laterally turned U-like shaped when viewed in side, and vertical force applied on the mast section 64 is received by the mast lower section 64b. The mast lower section 64b is projected outward in the frame 9 which is the chassis of the working vehicle 1 so as to connect the bottom surface of the mast to the side surface of the frame. Namely, the mast lower section 64b is connected to the bottom surface of the mast section 64 and connected to the outer side surface of the front frame 63.

With regard to the working vehicle 1, the fuel tank and the hydraulic oil tank 90 are attached while hung by the mast lower section 64b and the beam 62b. The fuel tank and the hydraulic oil tank 90 are respectively connected to the side portions of the mast lower section 64b and the beam 62b, disposed at the same side of the working vehicle 1, and supported. Accordingly, the support construction of the fuel tank and the hydraulic oil tank 90 is simplified so as to reduce the number of parts. When a connection part of an upper portion of a tank is similar, a tank of different capacity can be attached easily. The tank is supported by the rigid frame. The tank is attached to the bottom surface of the mast lower section 64b constituting the bottom portion of the mast section 64 connected to the lift mechanism of the loader 2 so that a space below the projected mast is used effectively, whereby the working vehicle 1 is constructed compactly.

The front plate 61 connects the front portion of the front frames 63 to each other so as to construct the front surface of the frame 9 which is the chassis of the working vehicle 1. Holes 61b for tie-down are provided in the left and right lower portions of the front plate 61. When the working vehicle 1 is conveyed, rope for fixation or the like is attached to the holes 61b for tie-down. The holes 61b are provided at the left and right of the front plate 61 so that durable holes for tie-down are constructed. The holes 61b for tie-down are opened longitudinally so that the rope or the like fixed to the holes are hardly twisted. The holes for tie-down are provided without welding any member to the front plate 61 so that any projection is not constructed in the front plate 61, whereby external appearance of the front of the working vehicle 1 is improved.

A notch is constructed in the central upper portion of the front plate 61 so as to simplify the steps of attaching a holding mechanism of the bonnet 30.

The side portions of the front plate 61 are formed along the shape of the side surfaces of the front frames 63, and the lateral width of the front plate is tapered downward when viewed in front.

With regard to the frame structure of the working vehicle 1, a seat mount base 6b is provided so as to connect the upper surfaces of the left and right side frame 62 to each other, whereby the seat mount base 6b serves as a cross member. The seat mount base 6b disposed laterally is connected to the upper surface of the rear portion of the frame 9. The seat mount base 6b constitutes the cross member of the frame 9 so as to improve rigidity of the rear portion of the frame 9. Accordingly, rigidity of the rear portion of the frame 9 is improved by the seat mount base 6b supporting the seat, whereby the number of parts is reduced.

[Reinforcement of Front Portion]

Next, explanation will be given on the construction of the frame 9 in more detail.

Figure 7:
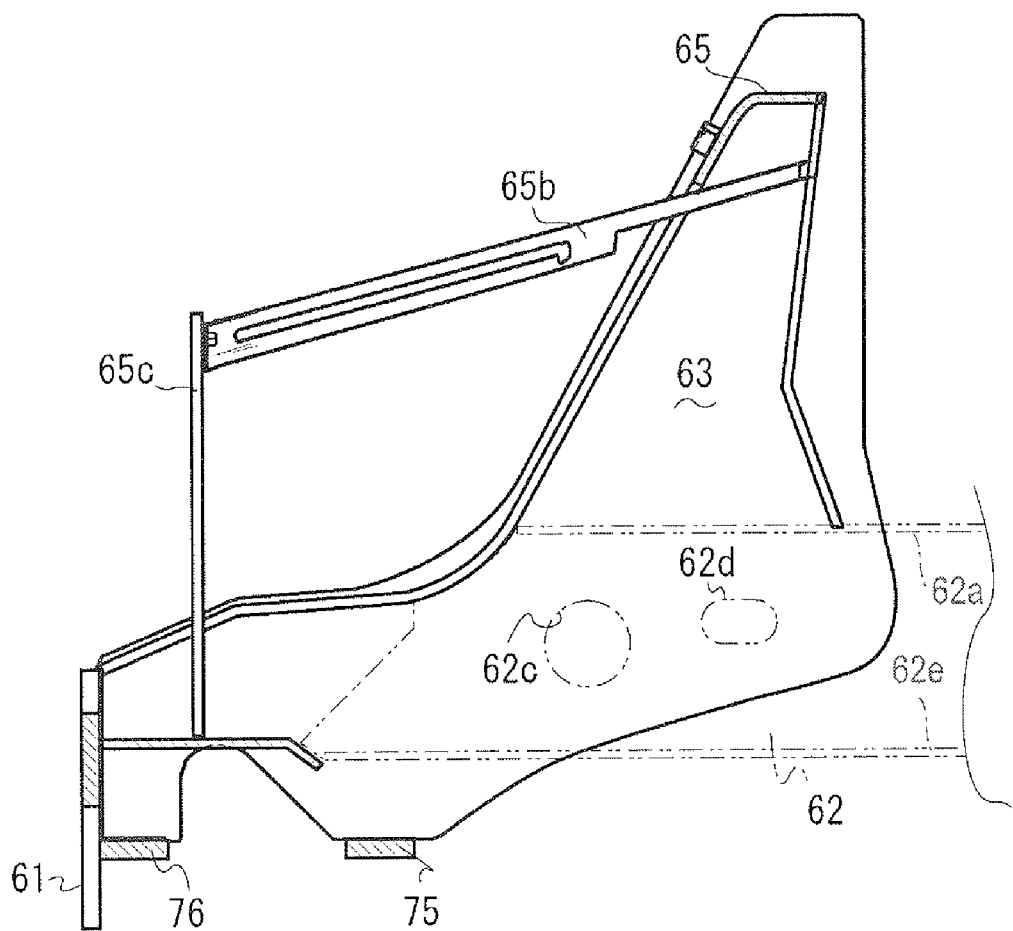
FIG. 7 is a side view partially in section of connection construction of a front frame and a side frame.

FIG. 7 is a side view partially in section of connection construction of the front frame and the side frame.

Figure 8:
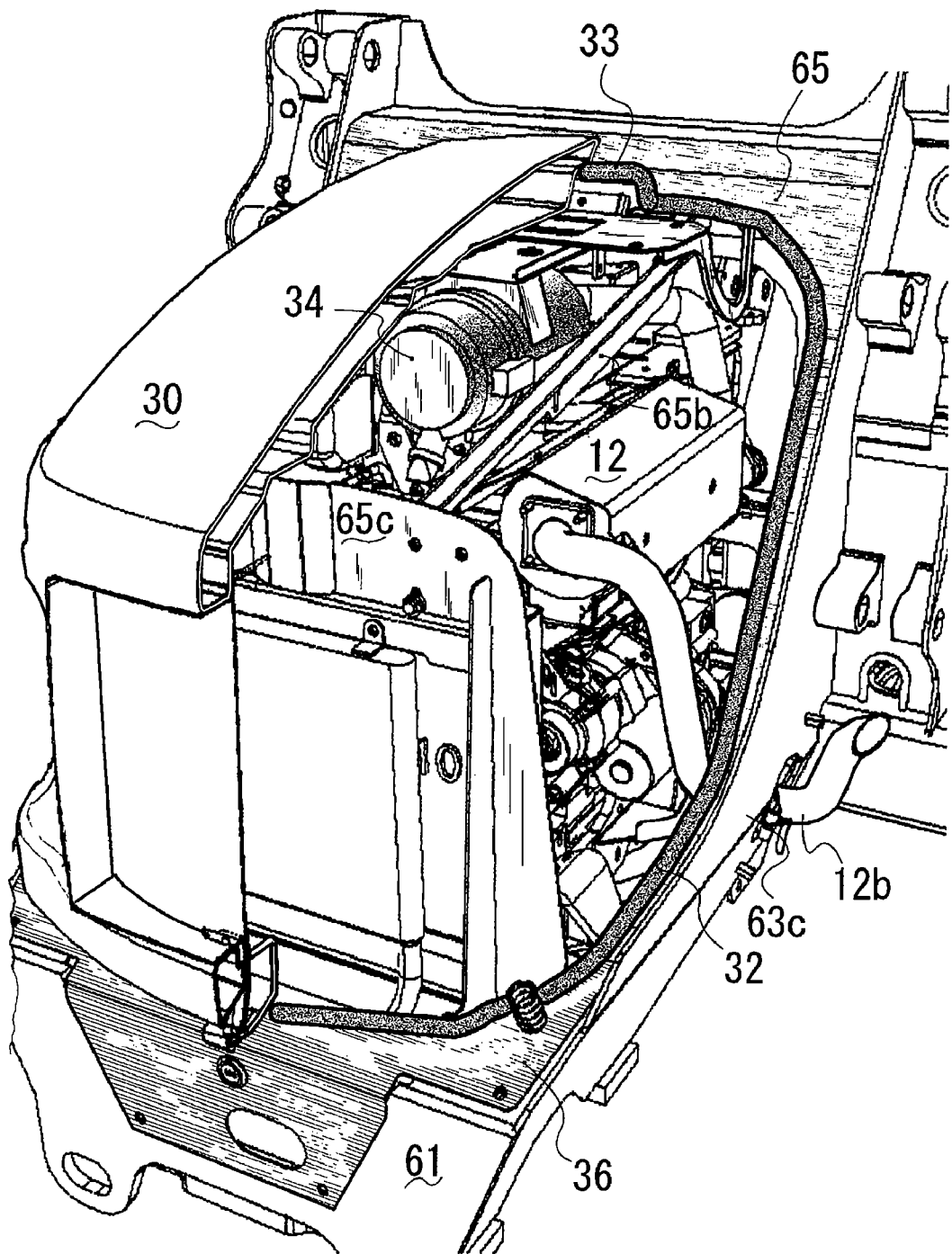
FIG. 8 is a perspective view partially in section of a front portion of the working vehicle.

FIG. 8 is a perspective view partially in section of a front portion of the working vehicle.

Figure 9:
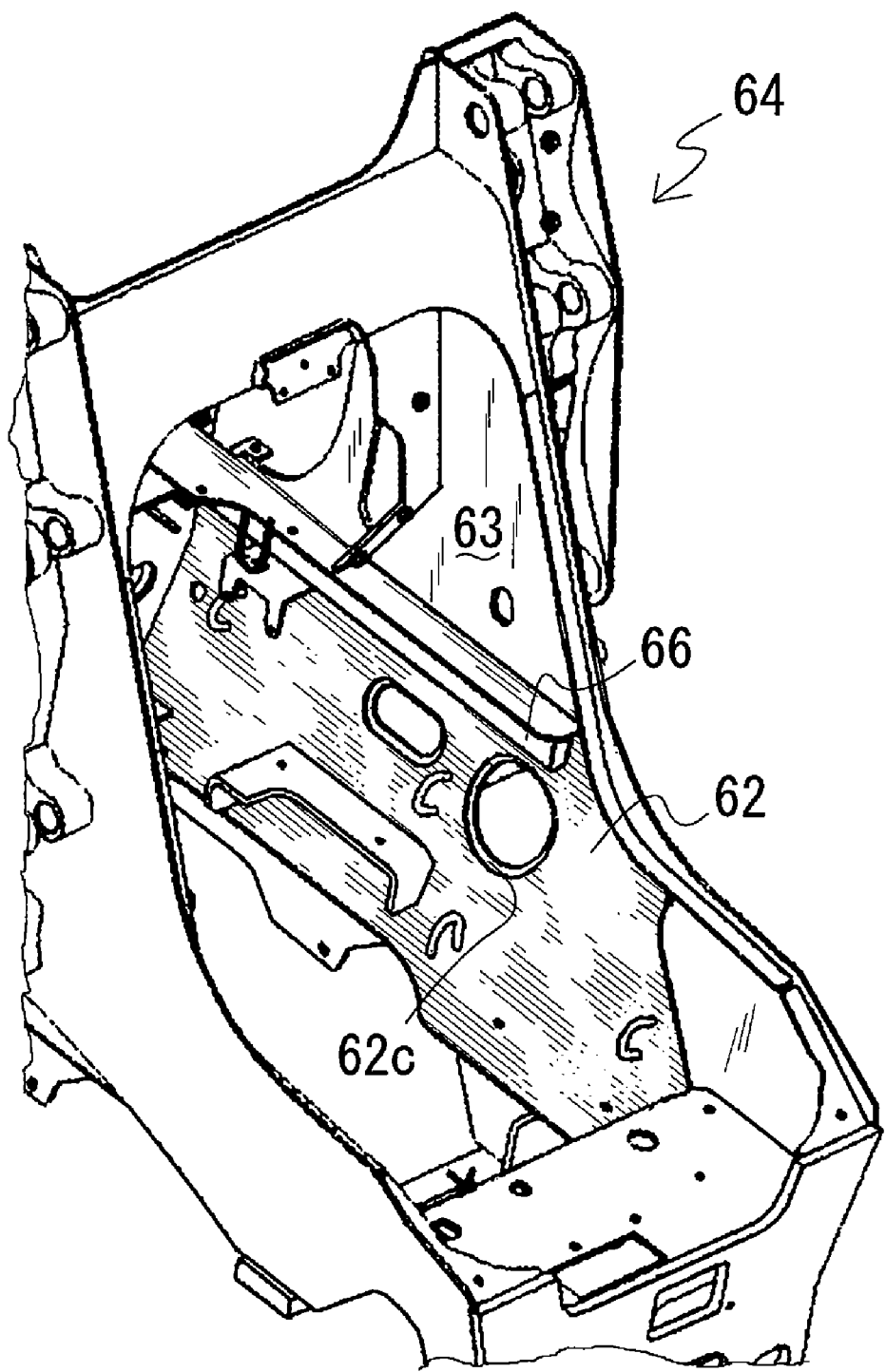
FIG. 9 is a perspective view of a left front portion of the frame.

FIG. 9 is a perspective view of a left front portion of the frame.

Figure 10:
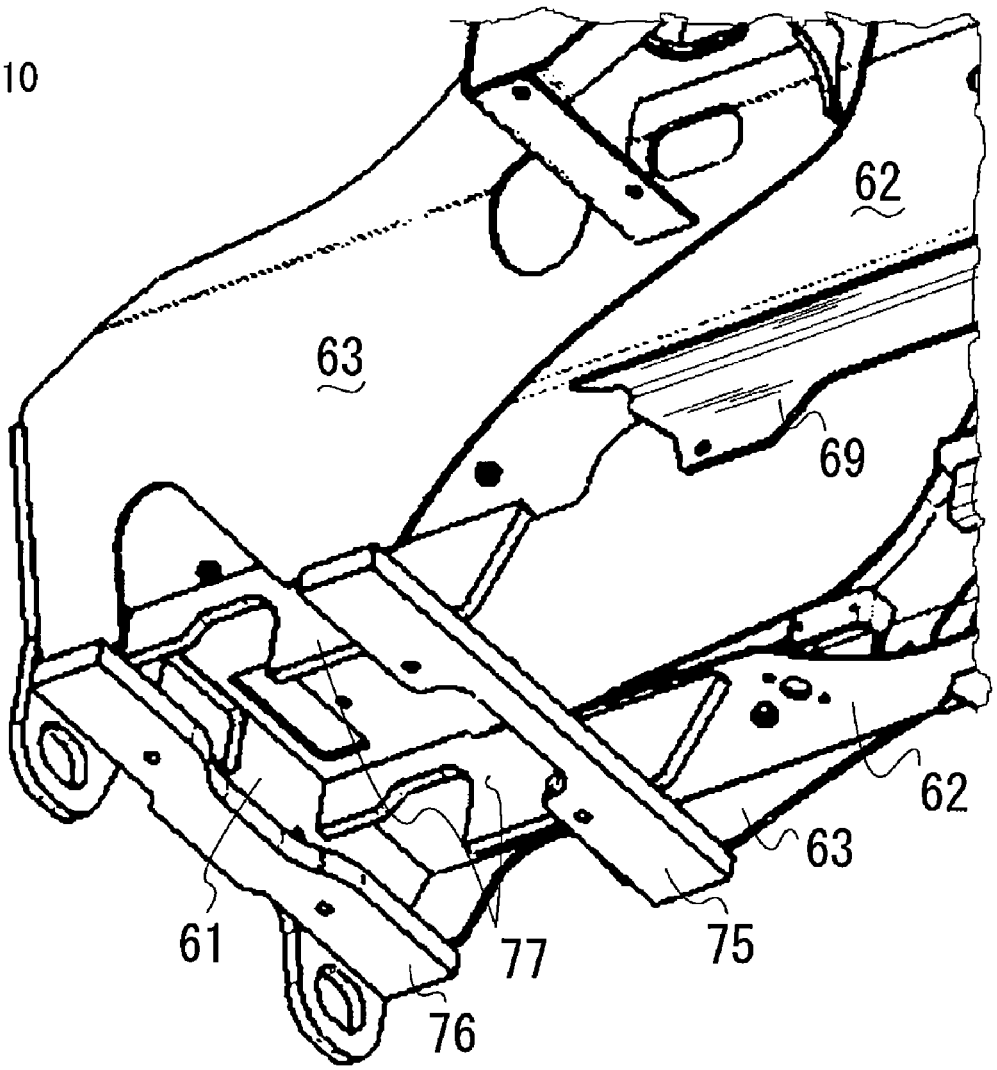
FIG. 10 is a perspective view of a lower front portion of the frame.

FIG. 10 is a perspective view of a lower front portion of the frame.

Figure 11:
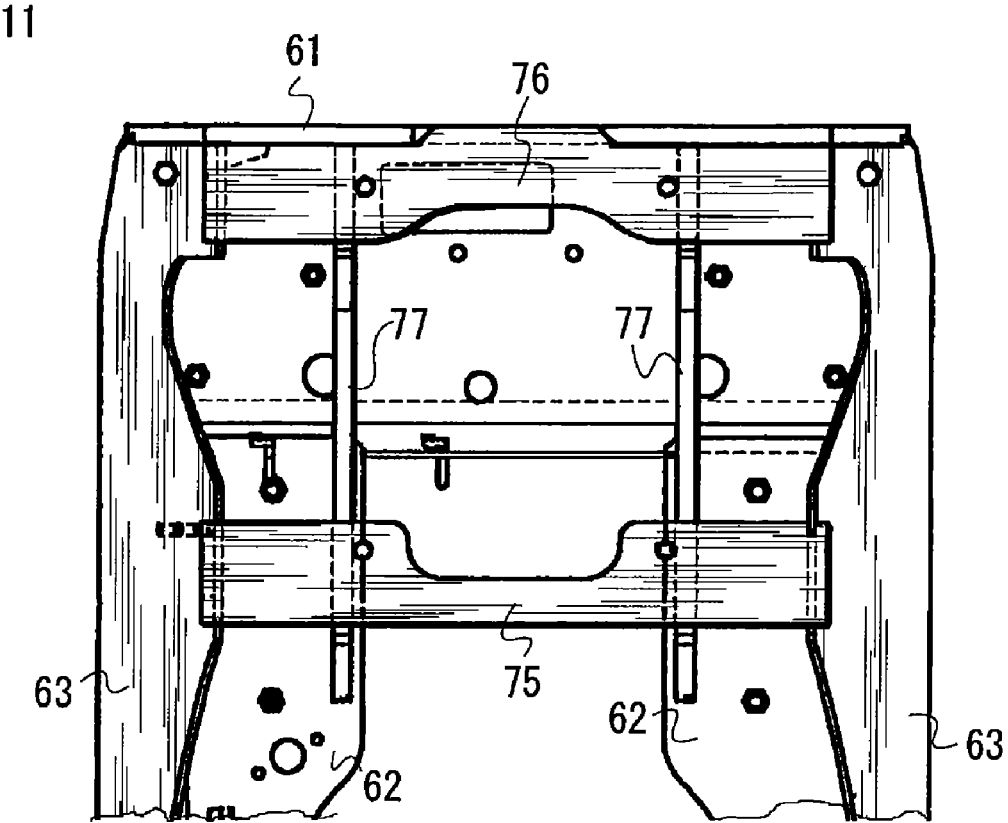
FIG. 11 is a bottom view of the same.

FIG. 11 is a bottom view of the same.

The frame 9 which is the chassis of the working vehicle 1 is constructed by welding flat plates and bent plates. Various portions of the frame 9 are reinforced so as to make the production of the frame of the working vehicle 1 easy and cheap. The bent plates can be constructed easily by bending so that the production cost of the working vehicle 1 is reduced and the processing is simplified compared with the case of using I-shaped steel.

The lower portion of the frame 9 is boat-shaped and tapered downward when viewed in front. Namely, the side surfaces of the lower portion of the frame 9 are slanted inward. By constructing the frame 9 as the above, a space in the vicinity of the front wheels 8 is secured sufficiently and the steering angle of the front wheels 8 is expanded.

With regard to the frame 9, the lower portions of the side frames 62 are bent inward, and the upper and lower ends thereof are bent inward horizontally. By bending the side frames 62 inward, the effective sectional area of the side frames 62 in front view is increased so as to improve rigidity of the side frames 62. Accordingly, interference of the front wheels and the frame 9 is prevented while improving rigidity of the side frames 62.

Similarly to the side frames 62, the lower portions of the front frames 63 are also bent inward. The inner side surfaces of the front frames 63 are connected to the outer side surfaces of the side frames 62 so as to construct the front portion of the frame 9. The mast section 64 is connected to the upper rear portions of the front frames 63, and attachment plates 75 and 76 disposed along lateral direction of a front transaxle are connected to the lower front portions of the front frames 63. Plate bodies 77 are connected to the upper surface of the attachment plate 75, and the plate bodies 77 are disposed longitudinally and parallel to each other. The side frames 62 are connected to the upper surfaces of the plate bodies 77, the attachment plate 75 is connected to the lower surfaces thereof, and the front plate 61 is connected to the front surfaces thereof. The plate bodies 77 are disposed between the front frames 63.

The attachment plate 75 is connected to the plate bodies 77 and the front frames 63, and the plate body 76 is connected to the front plate 61 and the front frames 63. Accordingly, durability of the lower front portion of the frame 9, which is an attachment part of the front transaxle, is improved. The plate bodies 77 and the attachment plates 75 and 76 are combined to each other while crossing mutually in the lower front portion of the frame 9, and then connected to the front plate 61, the front frames 63 and the side frames 62, whereby a box-like part is constructed. Accordingly, rigidity of the front portion of the frame 9 is improved by easy construction.

The attachment plates 75 and 76 to which the front transaxle is attached also serve as an oscillation stopper of the front transaxle regulating oscillation amount of the front transaxle by touching the front transaxle. Accordingly, the number of parts in the vicinity of the front transaxle is reduced.

The upper portion of the front frames 63 constitutes a part of the mast supporting loader 2, and the lower portion thereof constitutes a part of a member supporting the front transaxle. Accordingly, the mast support member and the front transaxle support member are constructed integrally by the front frames 63, whereby stress caused by applying load is dispersed so as to improve load capacity of the frame.

As shown in FIG. 7, each of the front frames 63 and the corresponding side frame 62 are combined to each other while crossing mutually. The front frame 63 and the side frame 62 are combined laterally turned T-like, and the side frame 62 is attached to the inner side of the front frame 63. Openings 62c and 62d are provided in the side frame 62 and edges of the openings 62c and 62d are welded to the front frame 63. Namely, the front frame 63 and the side frame 62 are plug-welded to each other while overlapping mutually. Accordingly, the front frame 63 and the side frame 62 are connected to each other easily and increase of lateral width caused by welding is prevented.

The connection part of the front frame 63 and the side frame 62 may also serve as a piping route. As shown in FIG. 8, a tailpipe 12b connected to a silencer 12 is extended outside the frame through an opening 63c. As shown in FIG. 9, the opening 62c of the side frame 62 is in agreement with the opening 63c of the front frame 63 so as to form a hole communicating the inside of the frame with the outside thereof. The bonnet 30 is disposed on the frame 9 in the front portion of the working vehicle 1. The bonnet 30 is formed hollowly by resin. The bonnet 30 covers the engine disposed on the frame 9. In addition to the engine, adjunct devices of the engine such as a radiator, the muffler silencer 12 and an air cleaner 34 are also disposed in the bonnet 30. The bonnet 30 can be opened and closed against the frame 9 and is opened by rotating upward the front portion of the bonnet 30. Seals 33 and 32 attached to the rib 65 is disposed between the bonnet 30 and the frame 9. A cover 36 is disposed in the front portion of the working vehicle 1 so as to cover the notch of the front plate 61.

The opening 63c is formed in the left front frame 63 and the opening 63c is in agreement with the opening 62c of the side frame 62. The edges of the opening 63c and the opening 62c are welded to each other so that the side frame 62 and the front frame 63 are connected to each other. The tailpipe 12b connected to the silencer 12 of the working vehicle 1 passes through the opening 63c so that exhaust of the engine is discharged outside the bonnet. The plug-welded part of the frame 9 is used for the piping so that a space for the piping is secured without affecting the frame 9.

With regard to the construction of the frame 9, the rib 65, which is a reinforcement plate connecting the inner side surface of each of the mast sections 64 extended outside the chassis to the upper surface of the corresponding side frame 62, is provided so as to improve rigidity of the front portion of the frame 9.

The rib 65 connecting the upper portions of the mast sections 64 to each other is connected to an upper portion of a radiator mount 65c by a slide guide 65b of the bonnet 30. One of ends of the slide guide 65b is fixed to the rib 65, and the other end thereof is fixed to the radiator mount 65c. Accordingly, support rigidity of the radiator mount 65c is improved so that silence in the engine room and air flow in the engine room can be controlled easily.

The support member of the radiator mount 65c also serves as the slide guide so that support rigidity of the engine room is improved while reducing cost, whereby the space in the engine room is saved.

[Reinforcement of Center and Rear Portions]

Next, explanation will be given on reinforcement construction of the frame 9 at the central portion of the vehicle.

Figure 12:
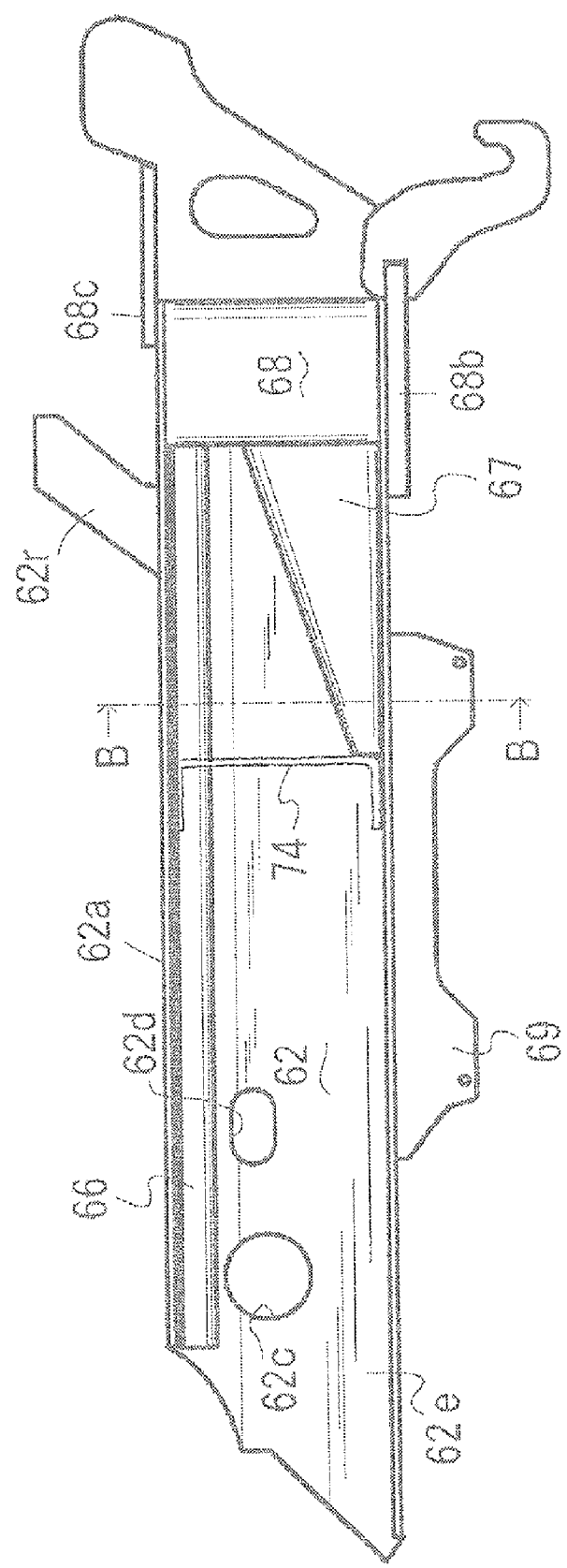
FIG. 12 is a side view of the side frame.

FIG. 12 is a side view of the side frame.

Figure 13:
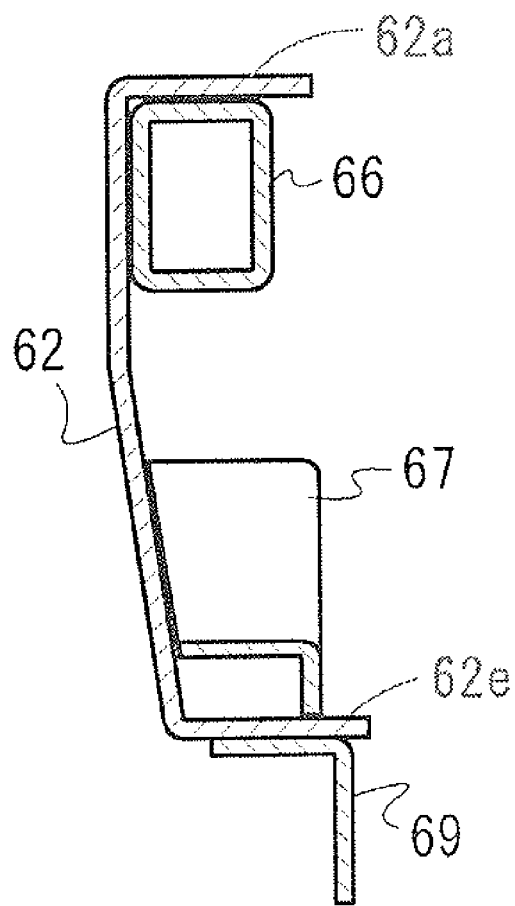
FIG. 13 is an arrow sectional view of the line B-B in FIG. 12.

FIG. 13 is an arrow sectional view of the line B-B in FIG. 12.

Figure 14:
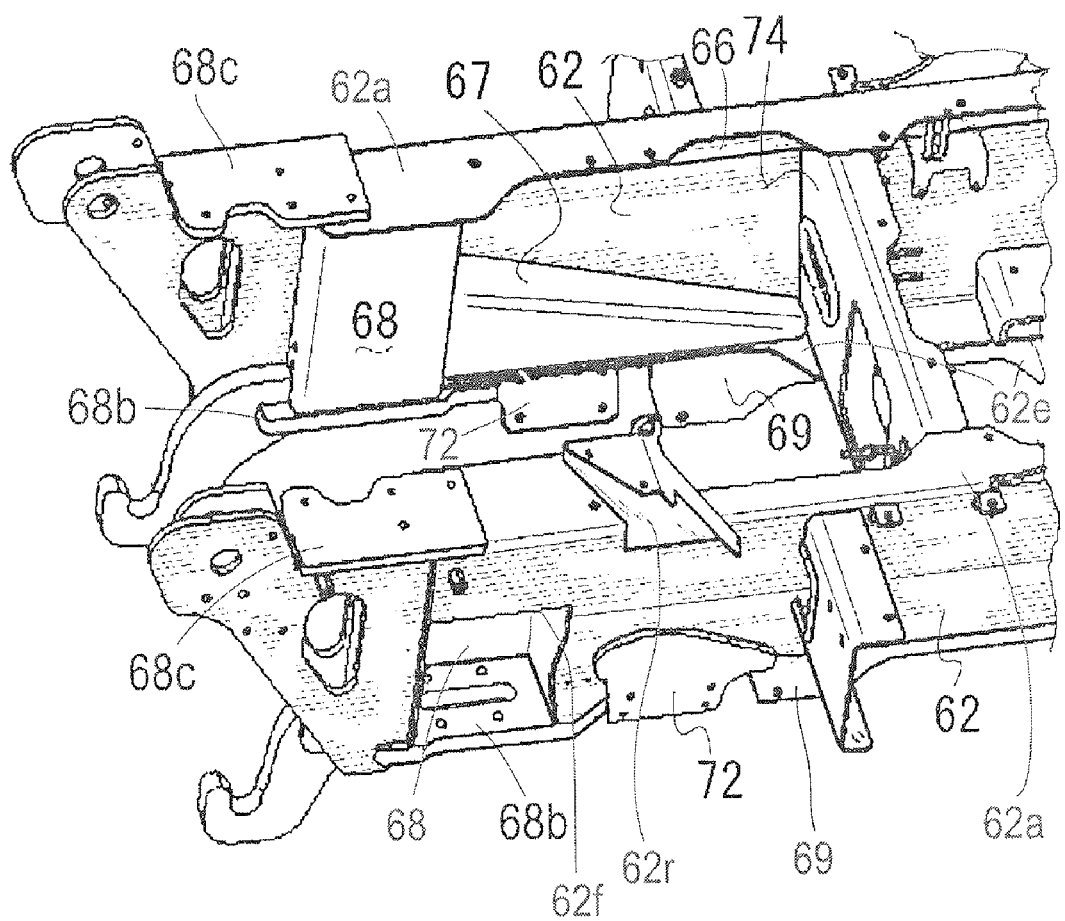
FIG. 14 is a perspective view of a rear portion of the frame.

FIG. 14 is a perspective view of a rear portion of the frame.

Each of the side frames 62 is longitudinally extended and C-like shaped when viewed in front. Reinforcement members are attached to the side frames 62. Each of the side frames 62 is provided with a pipe 66 attached to an upper portion thereof, with a rear reinforcement 68 attached to a rear portion thereof, and with a reinforcement member 67, which is substantially triangular when viewed in side, attached to a lower rear portion thereof. Each of the side frames 62 is provided with a lower reinforcement member 69 attached to a lower surface of the longitudinal center thereof and extended along the longitudinal direction of the side frame 62.

The pipe 66 attached to the upper portion of the side frame 62 is square shaped when viewed in section, and passes by the middle partition 74 disposed in the longitudinal central portion of the side frame 62 so as to extend from the engine space to the transmission space. The upper portion of the side frame 62 is bent to have a horizontal top bent portion 62a, and the pipe 66 is attached to the inner side surface of the upper portion of the side frame 62 and is extended along the top bent portion 62a from the upper front end of the side frame 62 to the rear reinforcement member 68. Accordingly, a part, to which large stress is applied, of the frame structure 9 which is the chassis of the working vehicle 1 is reinforced effectively. The square pipe used for the reinforcement can have a sufficient extent for facilitating its attachment to the side frame 62.

The rear reinforcement member 68 is attached to the rear portion of each of the side frames 62, and a rear transaxle is fixed to the rear reinforcement members 68 via later-discussed plates 68b. An opening 62f is provided in a part of the side frame 62 having the rear reinforcement member 68 attached thereto so that the rear transaxle can be attached to the frame structure 9 from the outside of the side frames 62.

The reinforcement member 67 is attached to the side frame 62 between the rear reinforcement member 68 and the middle partition 74, and the reinforcement member 67 is connected at a rear end thereof to the rear reinforcement member 68, and at a front end thereof to the middle partition 74. The reinforcement member 67 is inversed L-like shaped when viewed in section. Each of the side frames 62 is bent at a lower portion to have a horizontal bottom bent portion 62e. The reinforcement member 67 is connected to the bottom bent portion 62e and the inner side surface of the side frame 62 and the opening side of the sectional L-like shape of the reinforcement member 67 faces the side frame 62.

The part of the side frame 62, to which the reinforcement member 67 is attached, and the reinforcement member 67 defines a square structure when viewed in section. Accordingly, this part of the side frame 62 receiving reaction of driving force and load applied on a hitch is improved in rigidity, and this part, serves as a part of the frame structure 9, to which large stress is applied, is reinforced effectively.

The lower reinforcement member 69 is inversely L-like shaped when viewed in front, a vertical part thereof is extended downward from a lateral inward side (the opening side of the side frame 62) of the bottom bent portion 62e. The lower reinforcement member 69 is extended from the engine space to the transmission space in the frame structure 9. A horizontal part of the lower reinforcement member 69 is attached to the lower surface of the bottom bent portion 62e of the side frame 62 so that the bottom part, to which large stress is applied, of the frame structure 9 which is the chassis of the working vehicle is reinforced effectively, thereby ensuring high rigidity while ensuring facility in assembling of the frame structure 9.

[Attachment Construction of Transmission]

Next, explanation will be given on construction for attaching the transmission 10 to the frame structure 9 of the working vehicle 1.

Figure 15:
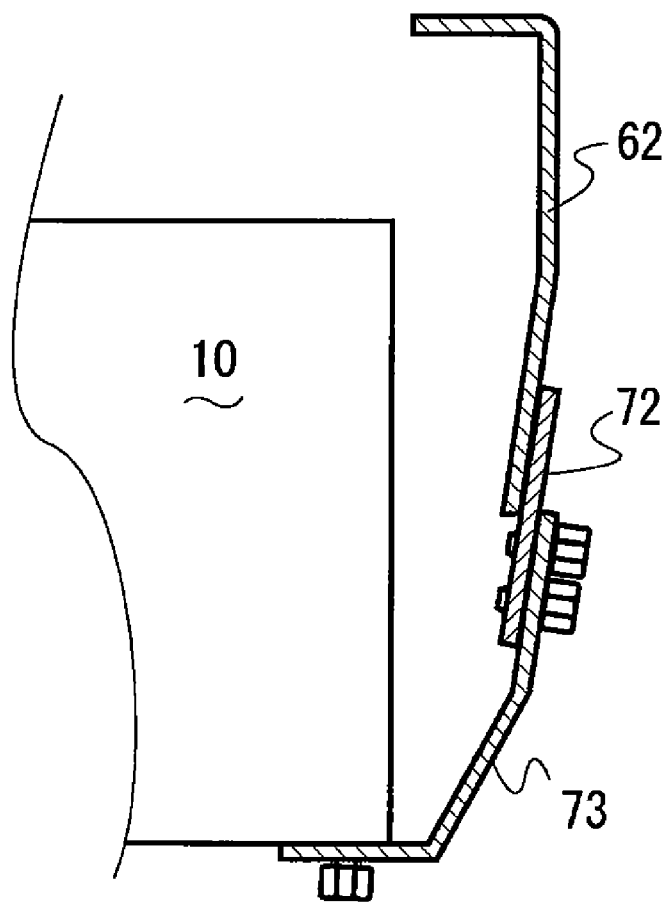
FIG. 15 is a schematic drawing of attachment construction of a transmission to the frame.

FIG. 15 is a schematic drawing of attachment construction of the transmission to the frame.

Figure 16:
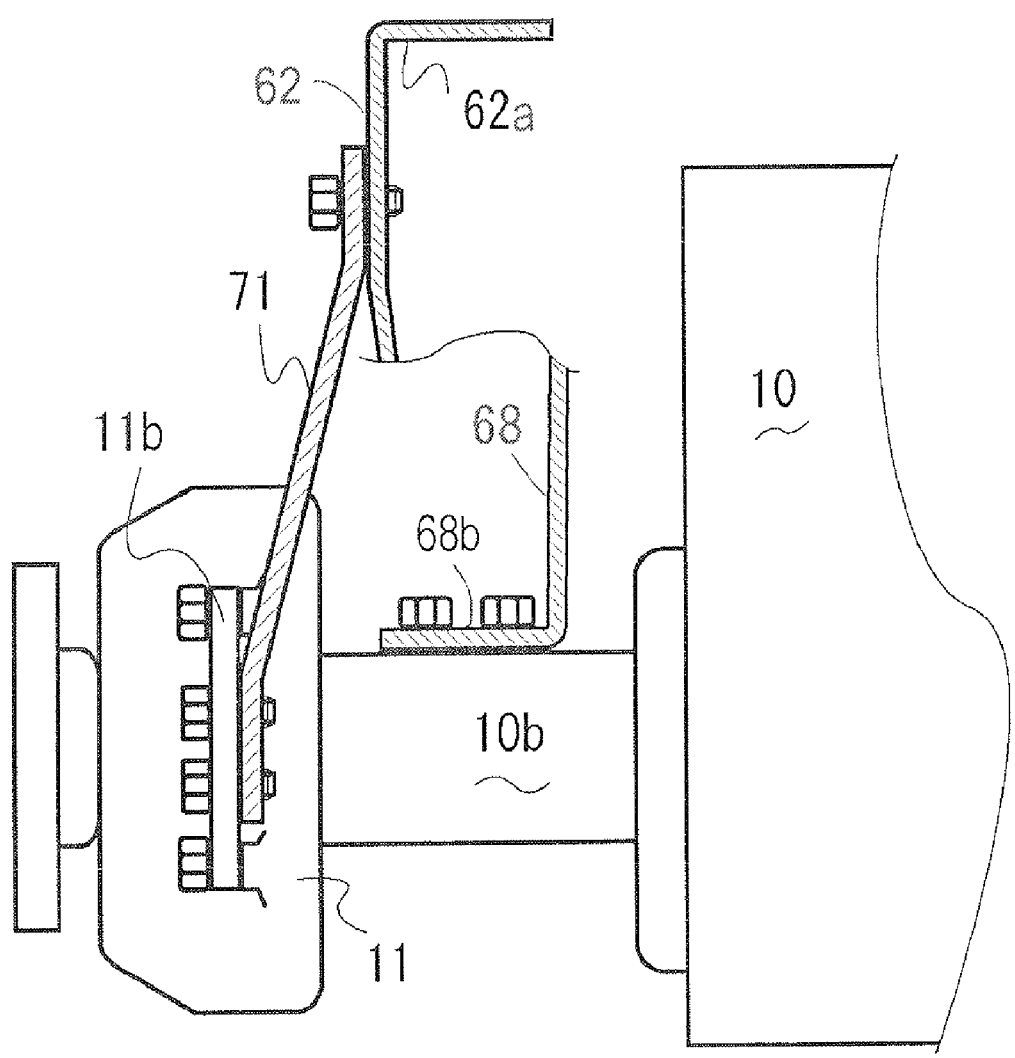
FIG. 16 is a schematic drawing of attachment construction of a rear transaxle.

FIG. 16 is a schematic drawing of attachment construction of the rear transaxle.

Rear left and right plates 72 are fixed to outer side surfaces of the rear portions of the respective side frames 62 having the reinforcement members 67 on the inside thereof, stays 73 are extended downward from the respective plates 72, and the transmission 10 is attached onto the stays 73 fixed to the rear portions of the side frames 62 through the rear plates 72. The transmission 10 is fixed to rear transaxles, and the transmission 10 is fixed at a lower or side surface thereof to each of the stays 73, which is L-like shaped when viewed in front and extended from the side frame 62. In the embodiment shown in FIG. 15, each of the stays 73 is connected at a lower end thereof to the lower surface of the transmission 10. The stay 73 is a bent plate. The stay 73 is extended downward from the outer side surface of the side frame 62 and is bent to extend to the inside of the vehicle so as to be connected to the lower surface of the transmission 10. The stay 73 may alternatively be connected to the side surface of the transmission 10.

Since the stays 73 are adapted to fix the transmission 10 to the side frames 62, the frame structure 9 is adaptable to support any of various transmissions. The stay 73 absorbs a part of force, applied by the transmission 10, by transforming or the like. When excessive load is applied by the transmission 10, the stays 73 transform elastically so as to disperse the force, thereby protecting the side frames 62, the transmission 10, rear final transaxle casings 11 and rear transaxle casings 10b.

The transmission 10 and each of the rear final transaxle casings 11 define a power train which is arch-shaped when viewed in plan as shown in FIG. 10. The rear final transaxle casing 11 is connected at a front portion thereof to an axle of the rear wheel 7 and is connected to a lateral distal end of the corresponding rear transaxle casing 10b, thereby serving as an outer end part of the rear transaxle casing 10b. The rear transaxle casing 10b is extended laterally, and is connected at a lateral proximal end thereof to the transmission 10. The final rear transaxle casing 11, the rear transaxle casing 10b and the transmission 10 are aligned laterally of the vehicle 1 so as to define the power train arch-shaped when viewed in plan. The rear final transaxle casing 11 incorporates a final speed change mechanism and the side frame 62 is connected to a stay 11b formed on the rear final transaxle casing 11 through a stay 71. The stay 71 is fixed at an upper end thereof to the outer side surface of the side frame 62, and at a lower end thereof fixed to the stay 11b formed on the rear portion of the rear final transaxle casing 11.

The stay 71 supporting the rear final transaxle casing 11 functions as a spring so as to prevent excessive load from being applied on the chassis, thereby preventing the frame structure 9 of the chassis from being damaged. Excessive load in not applied on bolts so as to avoid loosening of the bolts. The stay 71 has a rigidity for supporting the rear final transaxle casing 11, and the rigidity is changed according to variation of characteristic of a member selected as the stay 71. The stay 71 is formed by a plate so as to reduce cost.

The rear transaxle casing 10b extended from the rear transaxle casing 11 is fixed to the rear reinforcement member 68. The rear reinforcement member 68 is a member bent in a laterally turned U-like shape when viewed in plan, and is attached at the opened side thereof to the inner side of the side frame 62. The rear reinforcement member 68 is extended between the top and bottom bent portions 62a and 62e of the side frame 62. A thick plate 68c is attached through the top bent portion 62a of the side frame 62 to the upper surface of the rear reinforcement member 68, and a thick plate 68b is attached to the lower surface of the rear reinforcement member 68. An opening 62f is provided in the part of the side frame 62 facing the rear reinforcement member 681s attached thereto, and a human hand can be accessed to the thick plate 68b through the opening 62f so as to fix the thick plate 68b to the rear transaxle casing 10b by screwing bolts. The frame structure 9 of the chassis of the working vehicle 1 is constructed as the above so that the rear final transaxle casings 11 and the rear transaxle casings 10b can be attached to the frame structure 9 easily, allowing the working vehicle 1 to be more easily assembled.

[Attachment Construction of Tank]

Next, explanation will be given on the tanks disposed in the working vehicle 1.

Figure 17:
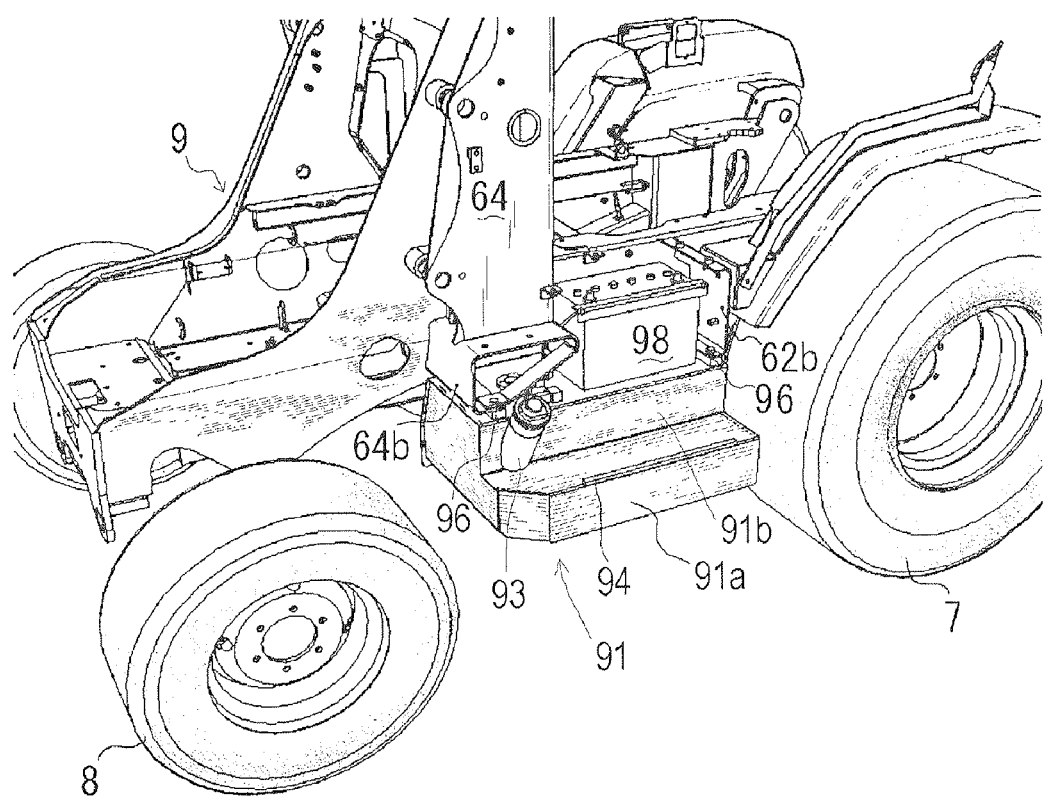
FIG. 17 is a perspective view of attachment construction of a tank.

FIG. 17 is a perspective view of attachment construction of a tank.

Figure 18:
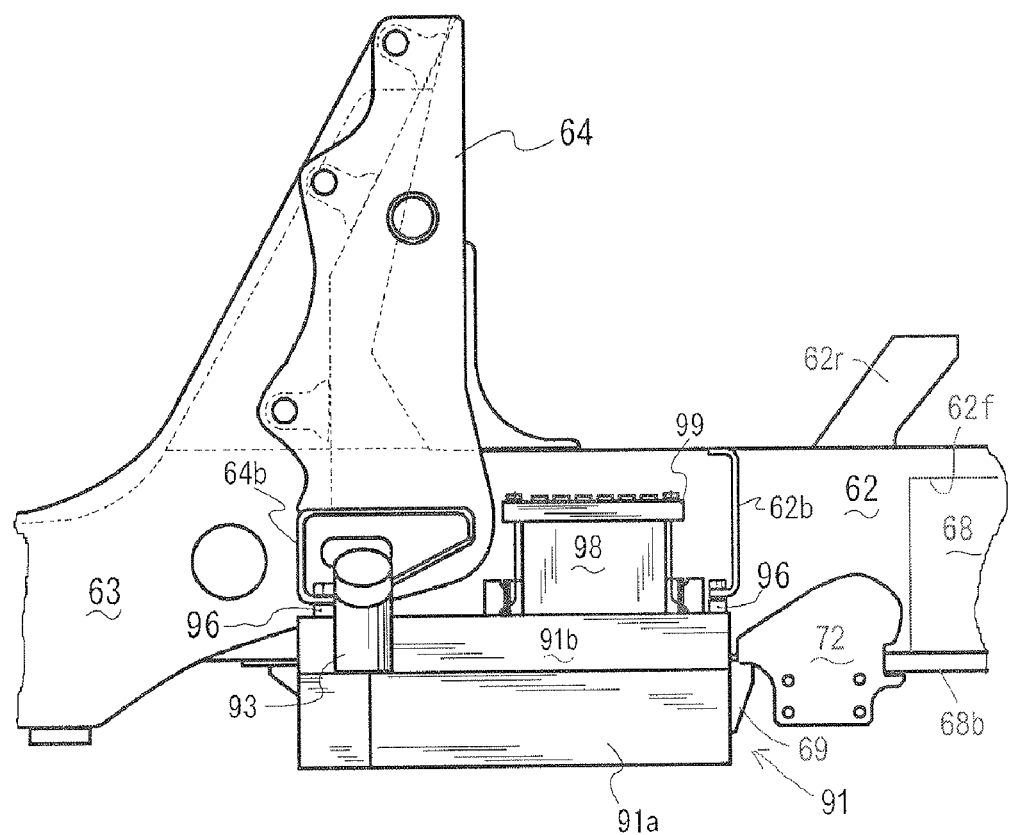
FIG. 18 is a side view of the same.

FIG. 18 is a side view of the same.

The hydraulic oil tank 90 and the fuel tank 91 are disposed at the sides of the operation part 4 of the working vehicle 1. The hydraulic oil tank 90 and the fuel tank 91 are hung at the sides of the frame 9 by members projected sideward from the frame 9. In this embodiment, the mast lower section 64b and the beam 62b are used as the members projected sideward, and the hydraulic oil tank 90 and the fuel tank 91 are attached to the lower surface thereof.

The mast lower section 64b and the beam 62b are projected from the side frames 62 constituting the frame 9. The mast lower section 64b is connected to the side frame 62 and the mast section 64 so as to improve rigidity of the mast section 64.

Connection parts 96 having tapped holes are provided in the upper surfaces of the hydraulic oil tank 90 and the fuel tank 91. Bolts are screwed to the connection parts of the tanks through the bottom surface of the mast lower section 64b and the bottom surface of the beam 62b so that the tanks are fastened to the bottom surface of the mast lower section 64b and the bottom surface of the beam 62b. The connection parts 96 are disposed laterally in the upper surface of the hydraulic oil tank 90 and the upper surface of the fuel tank 91, and a plurality of bolts are screwed at one connection part. The connection parts 96 are disposed laterally in the upper surfaces of the tanks so that high rigidity is secured when force is applied on the outer ends of the tanks and durability of the tanks is secured when an operator gets on or off.

In this embodiment, the hydraulic oil tank 90 is disposed at the right side of the frame 9 of the working vehicle 1, and the fuel tank 91 is disposed at the left side thereof. Each of the hydraulic oil tank 90 and the fuel tank 91 is step-like (L-like) shaped when viewed in front, and the lower portion of the tank is projected more sideward (toward the outside of the vehicle) than the upper portion thereof. Accordingly, the capacity of the tank with low height is secured sufficiently and the hydraulic oil tank 90 and the fuel tank 91 are constructed compactly in the vicinity of the operation part 4.

The stair surfaces of the tank can be used as a step to the operation part 4. A non-slip member 94 is attached to each of the edges of the hydraulic oil tank 90 and the fuel tank 91 so as to secure stability at the time of getting on or off.

An inlet 93 of the fuel tank 91 may be projected slantingly upward outward. In this construction, the inlet 93 is provided between an upper portion 91a and a lower portion 91b of the fuel tank 91. The inlet 93 is disposed at a portion of the outer side of the fuel tank 91 formed perpendicularly. A battery 98 is disposed on the upper surface of the fuel tank 91. The battery 98 is disposed between the mast lower section 64b and the beam 62b.

The hydraulic oil tank 90 and the fuel tank 91 are arranged as the above so that each of the hydraulic oil tank 90 and the fuel tank 91 can be used as a step to the operation part 4. An operator gets on or off by treading the hydraulic oil tank 90 or the fuel tank 91 so that the change of amount of corresponding one of pressure oil and fuel is recognized by the ear according to sound of treading. The battery 98 is arranged in a blank space of the frame 9 so that a space at the side of the frame 9 is used effectively.

The battery 98 disposed on the fuel tank 91 is covered by a cover attached to the working vehicle 1 so as to be protected from rainwater and mud.

[Piping of Mast Section]

Next, explanation will be given on the construction of the mast sections 64.

Figure 19:
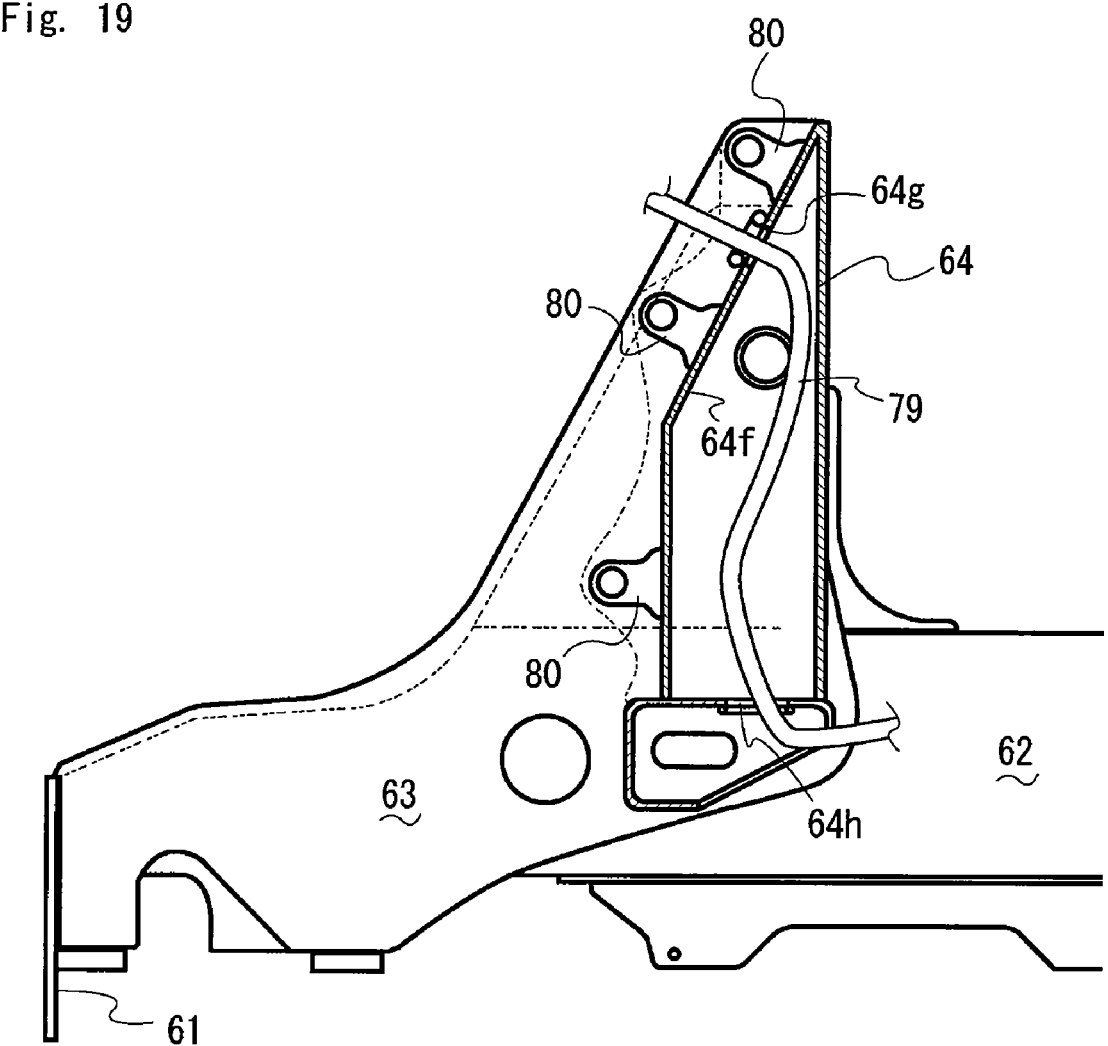
FIG. 19 is a side view partially in section of internal construction of a mast section.

FIG. 19 is a side view partially in section of internal construction of the mast section.

Each of the mast sections 64 is L-like shaped when viewed in plan, and is connected to the outer side surface of the corresponding front frame 63 and to the upper surface of the mast lower section 64b. A partition plate 64f is disposed between the mast section 64 and the front frame 63. Inside the mast section 64, a space is formed between the partition plate 64f and the mast section 64 so as to improve rigidity of the mast section 64. Piping 79 is disposed in the space.

Bosses 80 are disposed at corresponding positions of the inner surface of the mast section 64 and the outer surface of the front frame 63 so as to support a lift device of the loader 2 at both sides. The partition plate 64f is attached along the bosses 80 so as to improve support rigidity of the bosses 80. An opening 64g is provided in the upper portion of the partition plate 64f and an opening 64h is formed in the upper surface of the mast lower section 64b. The piping passing through the space surrounded by the partition plate 64f and the mast section 64 is taken in and out through the opening 64g and the opening 64g. The partition plate 64f is interposed in the mast structure, the piping is inserted from the lower surface and passes along the reverse side surface of the partition plate 64f, and the opening 64g is provided in the front surface of the partition plate 64f and then the piping 79 passes through the opening. Accordingly, the piping 79 is protected and the space in the vicinity of the mast section 64 is used effectively, whereby the working vehicle is constructed compactly.

[Reinforcement of Mast]

Next, explanation will be given on the reinforcement construction of the mast.

Figure 20:
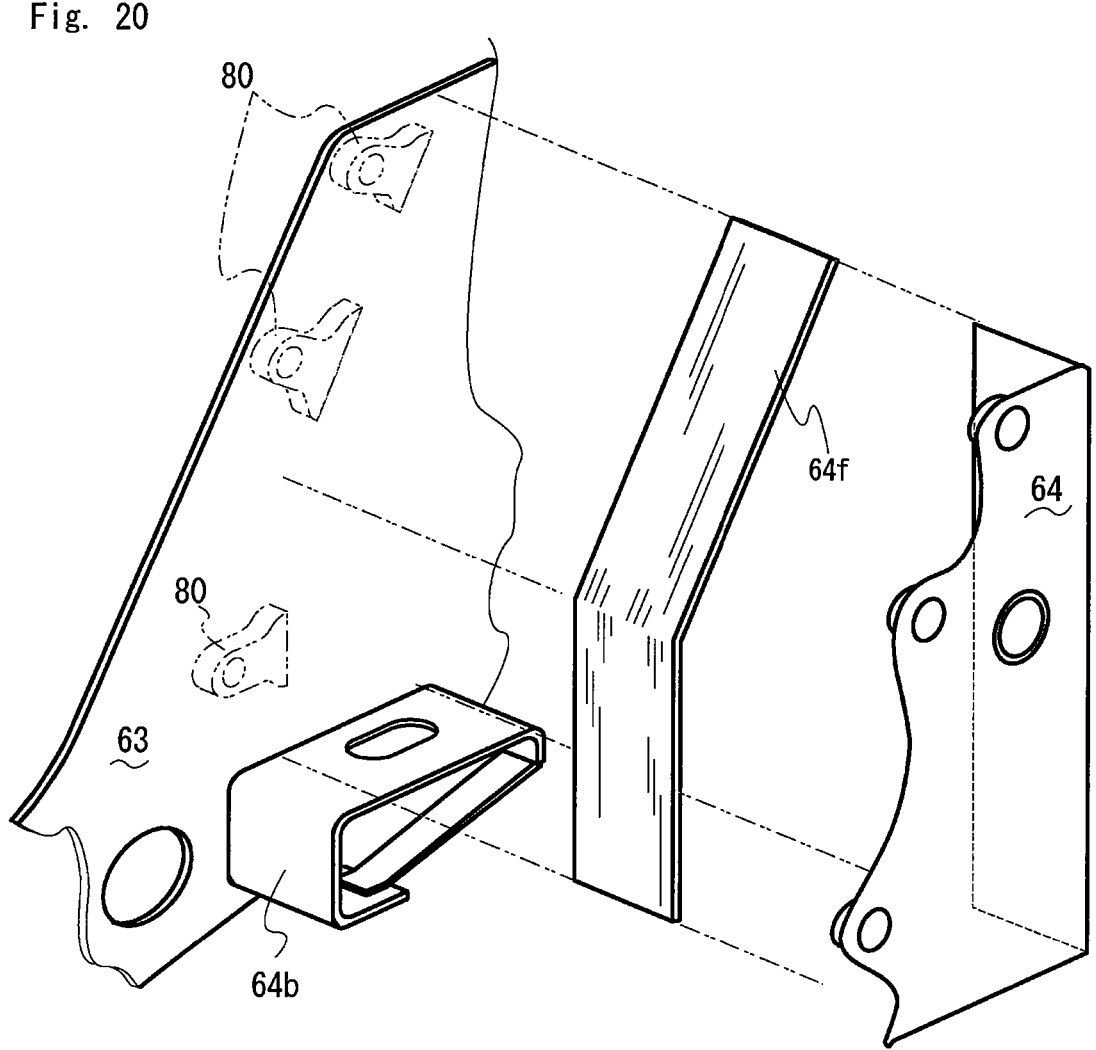
FIG. 20 is a drawing of assembly construction of a mast.

FIG. 20 is a drawing of assembly construction of the mast.

With regard to the frame 9 of the working vehicle 1, each of the mast comprises the mast section 64, the partition plate 64f, the mast lower section 64b and the bosses 80 and is extended to the outside of the frame 9 which is the chassis of the working vehicle 1.

The mast section 64 and the partition plate 64f are connected to the outer surface of the corresponding front frame 63 constructed integrally with the side frame 62. The bosses 80 of the inner side are connected to the outer side surface of the front frame 63 and the inner side of the partition plate 64f, and the bosses 80 of the outer side are connected to the inner side surface of the mast section 64 and the outer side of the partition plate 64f. The partition plate 64f is connected to the inner side surface of the mast section 64 and the side surface of the upper portion of the front frame 63 and also serves as a reinforcement plate of the mast. The upper portion of the mast lower section 64b is connected to the lower portions of the mast section 64 and the partition plate 64f, and the side surface of the mast lower section 64b is connected to the front frame 63.

The partition plate 64f is constructed by a thick plate so as to secure sufficient intensity and is triangle shaped when viewed in side. The partition plate 64f is constructed integrally with the mast section 64 so as to transmit stress of the mast section 64 to the front frame 63, whereby load capacity of the mast is improved.

[Reinforcement of Boss]

Next, explanation will be given to the reinforcement construction of the bosses 80.

FIG. 21 is a drawing of reinforcement construction of the bosses. FIG. 21(a) is a perspective view of reinforcement construction of the bosses, and FIG. 21(b) is a front view of reinforcement construction of the bosses.

Each of the bosses 80 is gently-sloping chevron-like shaped, and the left and right bosses 80 are connected to each other through the foots thereof by a reinforcement member 81. The reinforcement member 81 is connected to the lower portions of the bosses 80 and is substantially U-like shaped. The bosses 80 are connected to the reinforcement member 81 by welding so that the bosses 80 and the reinforcement member 91 are constructed integrally with each other. The bosses 80 may alternatively be formed integrally with the reinforcement member 81 previously.

The reinforcement member 81 is attached to the front surface of the partition plate 64f of the mast section 64 and is connected to the left and right bosses 80. The reinforcement member 81 may be connected to the upper and lower bosses 80 in addition to the left and right bosses 80.

The reinforcement member 81 is connected to the bosses 80 as the above so that the bosses 80 and the mast section 64 are reinforced easily.

[Attachment Construction of Lever Stand]

Next, explanation will be given on a lever stand 85 disposed to the working vehicle 1.

Figure 22:
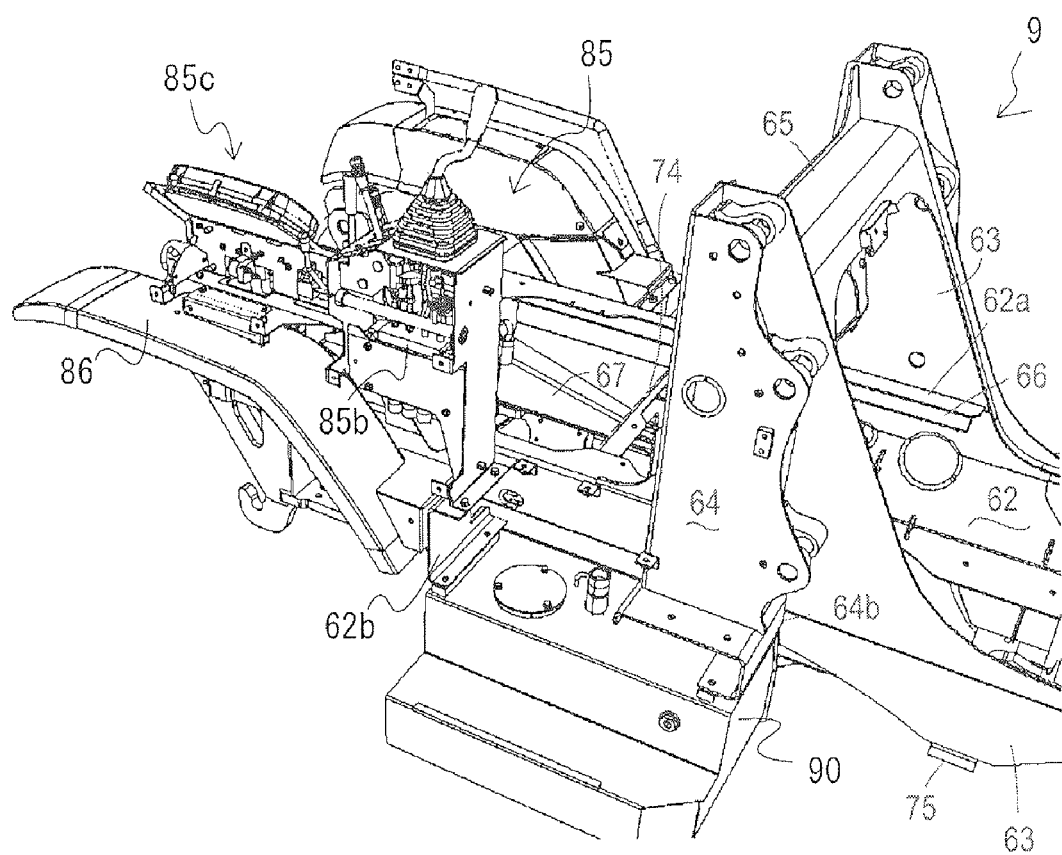
FIG. 22 is a perspective front view of attachment construction of a lever stand.

FIG. 22 is a perspective front view of attachment construction of the lever stand.

Figure 23:
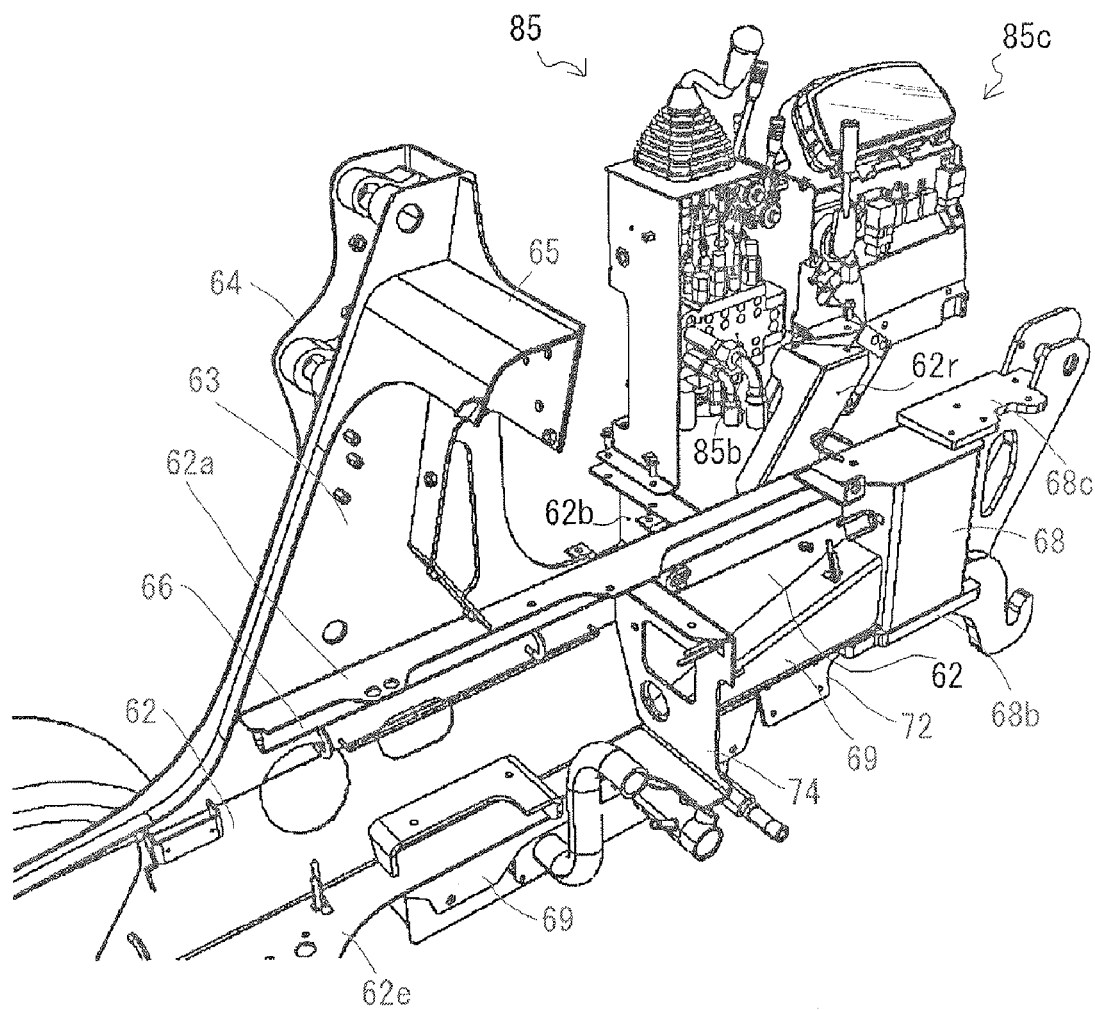
FIG. 23 is a perspective rear view of the same.

FIG. 23 is a perspective rear view of the same.

Figure 24:
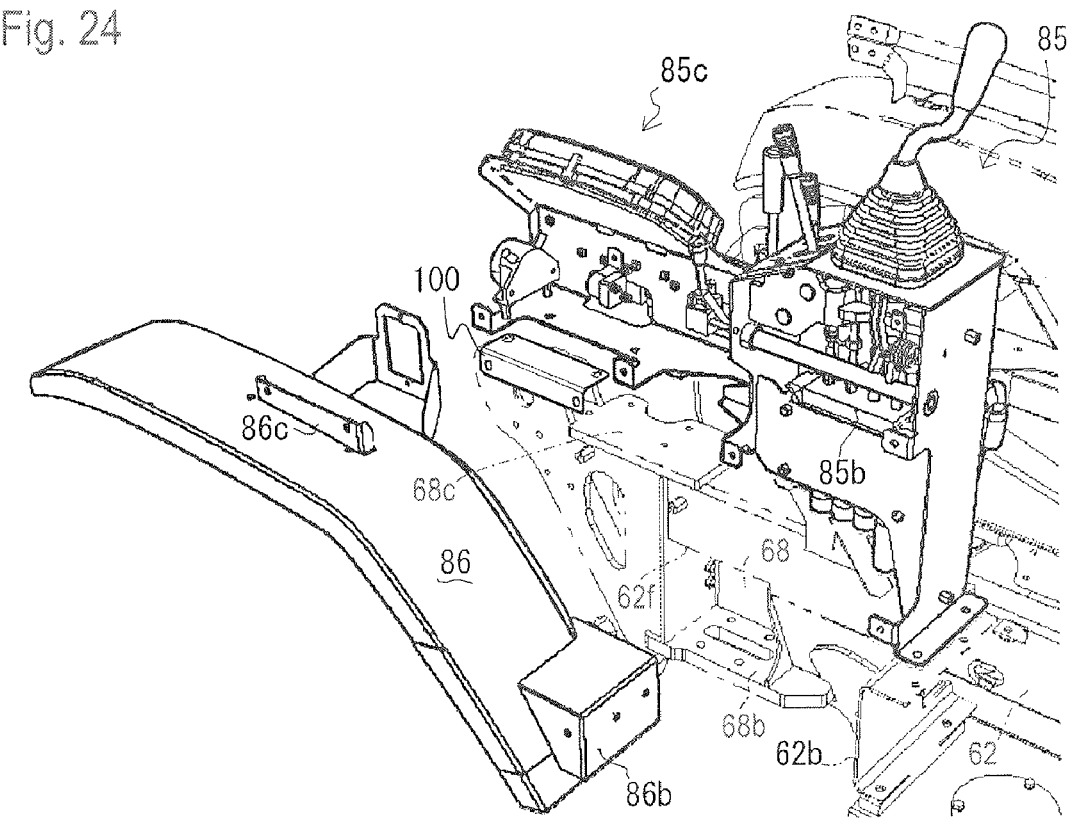
FIG. 24 is a drawing of attachment construction of the lever stand and a rear fender.

FIG. 24 is a drawing of attachment construction of the lever stand and a rear fender.

Figure 25:
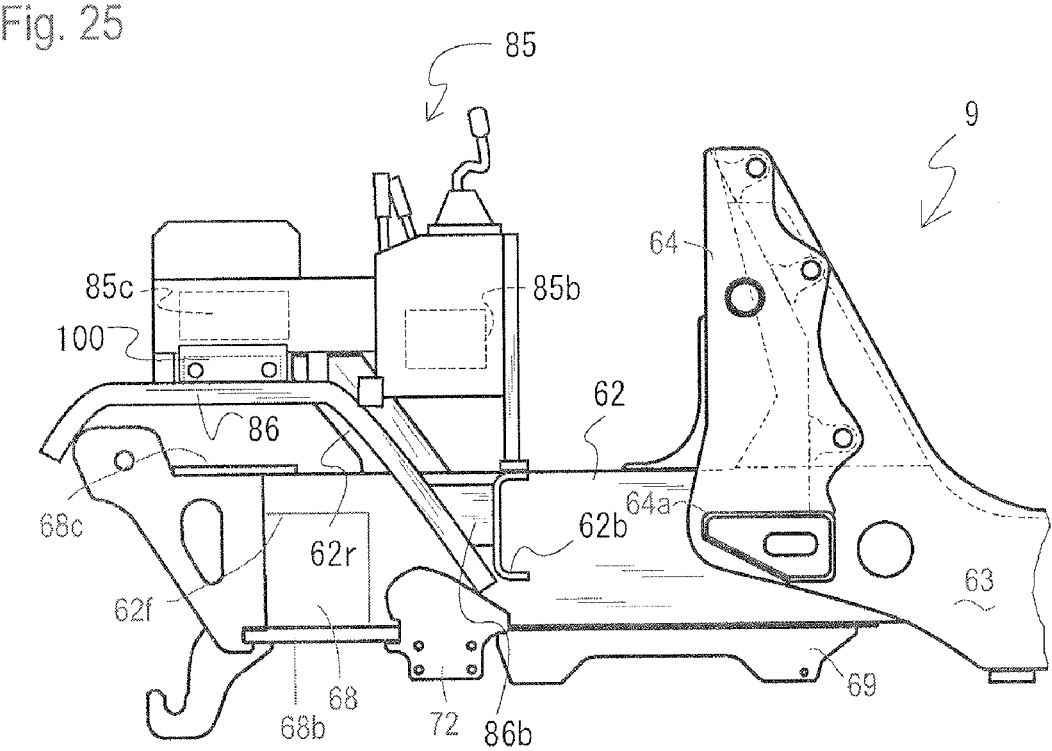
FIG. 25 is a schematic drawing of attachment construction of the lever stand.

FIG. 25 is a schematic drawing of attachment construction of the lever stand.

Figure 26:
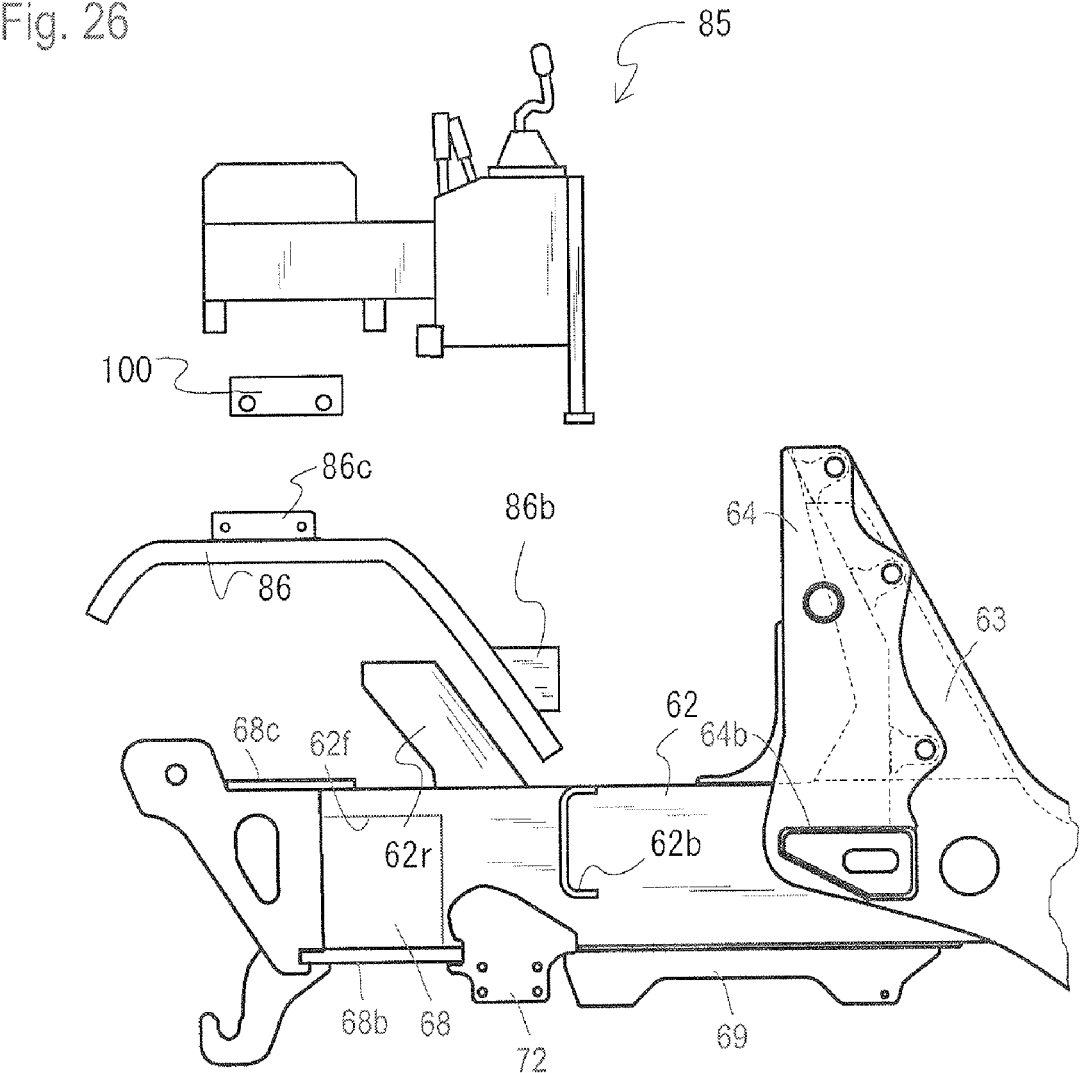
FIG. 26 is a schematic drawing of assembly construction of the lever stand.

FIG. 26 is a schematic drawing of assembly construction of the lever stand.

Figure 27:
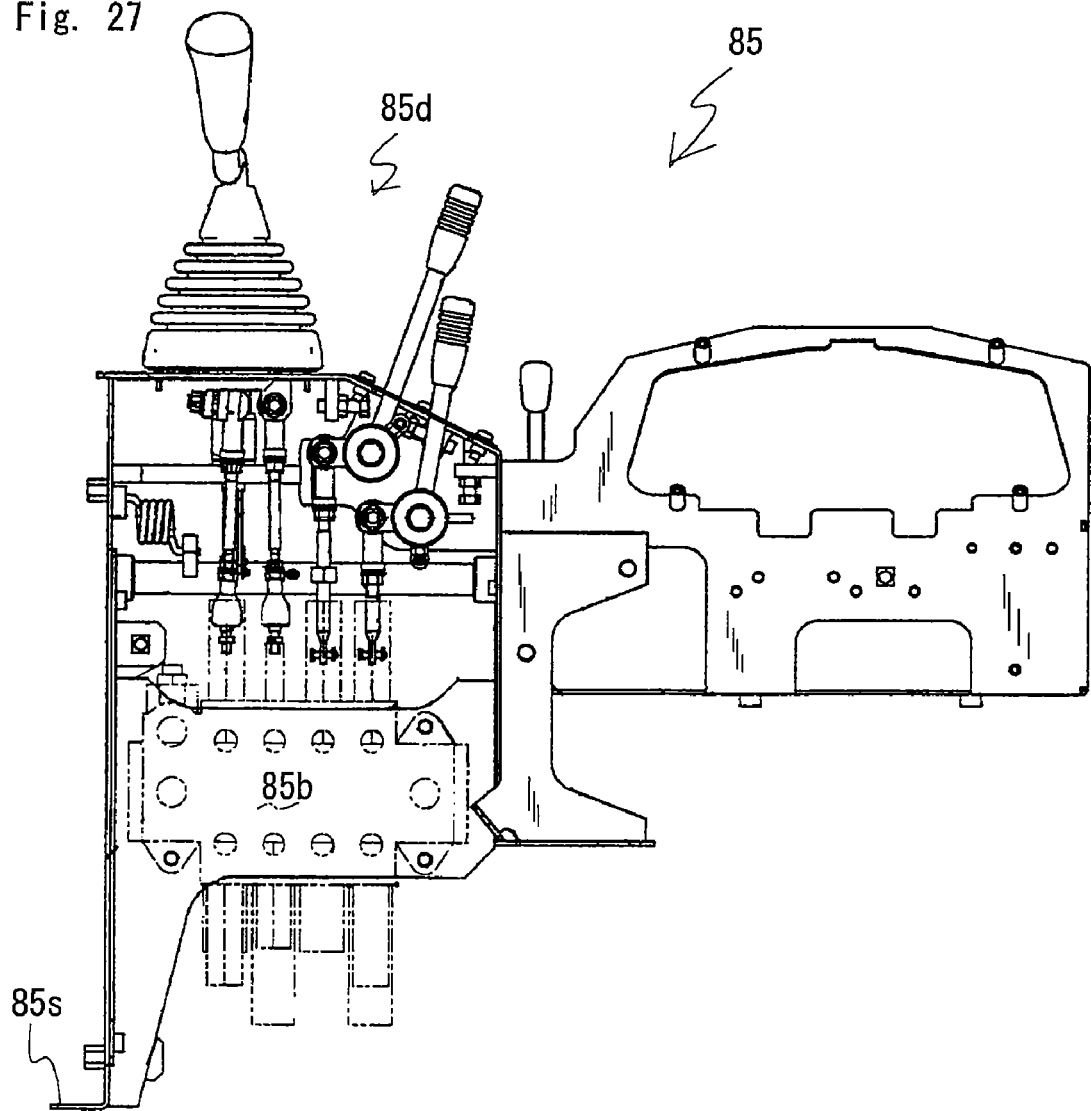
FIG. 27 is a front view of the lever stand.

FIG. 27 is a front view of the lever stand.

The lever stand 85 is attached to the frame 9 of the working vehicle and is disposed in the operation part 4. Operation levers operating the front loader 2 and the like are disposed in the lever stand 85, and the levers are connected to a hydraulic valve unit 85b attached to the lever stand 85. The hydraulic valve unit 85b is attached to the lever stand 85 so as to be constructed integrally with the lever stand 85. The lever stand 85 is attached to the frame 9 and then hydraulic piping is connected to the hydraulic valve unit 85b so that hydraulic apparatuses are operated by the levers.

An electronic part assembly 85c of a meter and the like is attached to a part extended rearward from the lever disposition part of the lever stand 85. The hydraulic operation levers, the hydraulic valve unit 85b and the electronic part assembly 85c are constructed integrally with the lever stand 85.

Accordingly, members which must be treated carefully are arranged intensively in the lever stand 85 so as to improve workability of assembly process of the working vehicle 1, whereby management of parts is simplified.

The electronic part assembly 85c is disposed on the surface, at the inner side of the vehicle, of the rearward extended part of the lever stand 85.

In the lever stand 85, the piping connection part of the hydraulic valve unit 85b and the electronic part assembly 85c are disposed at the inner side of the vehicle so that maintenance work of the hydraulic valve unit 85b and the electronic part assembly 85c is simplified, and wiring and piping work at the time of attaching is simplified.

The lower front portion of the lever stand 85 is connected to the upper surface of the beam 62b extended outward from the side frame 62, and the lower center portion and the lower rear portion of the lever stand 85 are connected to the upper surface of the side frame 62. A stay 62r extended upward rearward from the upper portion of the side frame 62 is connected to the vicinity of the disposition part of the electronic part assembly 85c so as to support the central portion of the lever stand 85.

Rear fenders 86 covering the rear wheels 7 is attached to the vicinity of the lever stand 85. Each of the rear fenders 86 is connected to the rear surface of the beam 62b and the rear portion of the lever stand 85 so as to be supported. A connection part 86b is provided in the lower front portion of the rear fender 86 and is fixed to the rear surface of the beam 62b by fastening. A stay 86c is provided in the upper portion of the rear fender 86 and is connected through a connection member 100 to the rear extended part of the lever stand 85 so as to absorb the gap of connection to a plurality of members in consideration of assemble ability. The stay 86c is extended upward from the upper surface of the rear fender 86. The lower portion of the connection member 100 is connected to the stay 86c and the connection member 100 is extended from the rear fender 86 toward the inner side of the working vehicle. The part of the connection member 100 extended toward the inner side of the vehicle is connected to the rear portion of the lever stand 85.

The front end of the fender 86 is fixed to the beam 62b and the central portion or the rear portion of the fender 86 is fixed to the frame 62 through the lever stand 85. The lever stand 85 also serves as a stay of the fender 86 so as to simplify the construction in the vicinity of the rear wheels 7 of the working vehicle 1.

Rigidity of the rear fender 86 which is a member made by a thin metal sheet is improved.

Namely, the lever stand 85 also serves as a support member of the fender 86 so as to reduce number of component parts of the working vehicle 1. The number of stays attached to the frame 9 of the working vehicle 1 is reduced so that labor of the production process is reduced, whereby the production cost is reduced.

The invention claimed is:

1. A frame structure for a working vehicle, the frame structure comprising:
   left and right side frames having an engine space and a transmission space therebetween, wherein the engine space is adapted to have an engine therein, wherein the transmission space is adapted to have a transmission therein, and wherein each of the left and right side frames is formed with a top bent portion and a bottom bent portion;
   a cross member extended between the left and right side frames so as to partition the engine space and the transmission space from each other;
   a longitudinal pipe fixed to an inner side surface of each of the side frames along the top bent portion of the side frame, wherein the longitudinal pipe passes by the cross member so as to extend from the engine space to the transmission space;
   a first reinforcement member fixed to the inner side surface of each of the side frames in the transmission space so as to extend downward from the top bent portion;
   a second reinforcement member fixed to the inner side surface of each of the side frames in the transmission space so as to extend along the bottom bent portion of the side frame between the cross member and the first reinforcement member; and
   a transmission attachment member fixed to an outer side surface of a portion of each of the side frames having the second reinforcement member on the inside thereof and extended downward so as to support the transmission disposed in the transmission space.

2. The frame structure for the working vehicle as set forth in claim 1, wherein a third reinforcement member is fixed to each of the side frames so as to extend along the bottom bent portion of the side frame from the engine space to the transmission space.

3. The frame structure for the working vehicle as set forth in claim 1, further comprising:
   left and right front frames attached to outer side surfaces of the portions of the respective left and right side frames defining the engine space, wherein each of the front frames has an upper portion extended upward from the top bent portion of the corresponding side frame;
   a mast section extended outward from the upper portion of each of the front frames; and
   a plate body fixed to an outer side surface of a portion of each of the front frames overlapping the corresponding side frame and to a bottom surface of the mast section so as to connect the mast section to the side frame through the front frame.

4. The frame structure for the working vehicle as set forth in claim 3, wherein each of the mast sections is connected through a mast partition plate to the outer side surface of the corresponding one of the front frames, and wherein the mast partition plate is fixedly provided thereon with a pair of left and right bosses for supporting a lift arm therebetween, and with a U-like reinforcement member connecting the left and right bosses to each other.

5. The frame structure for the working vehicle as set forth in claim 3, wherein the upper portions of the left and right front frames, from which the respective mast sections are extended outward, are connected to each other by a reinforcement plate.

6. The frame structure for the working vehicle as set forth in claim 5, wherein a mount of a radiator is disposed between the left and right front frames, and wherein a connection member is provided so as to connect an upper portion of the mount to the reinforcement plate.

7. The frame structure for the working vehicle as set forth in claim 6, wherein the connection member is constructed integrally with a slide guide for sliding a stay of an engine bonnet.

8. The frame structure for the working vehicle as set forth in claim 1, wherein a base of a seat mount is connected to the top bent portions of the left and right side frames so as to constitute a second cross member.

9. The frame structure for the working vehicle as set forth in claim 1, wherein the second reinforcement member is substantially triangular when viewed in side.

10. The frame structure for the working vehicle as set forth in claim 1, wherein each of the first reinforcement members is U-like shaped when viewed in plan, and wherein each of rear transaxle casings respectively extended leftward and rightward from the transmission is fixed to a plate member attached to a lower portion of the first reinforcement member.

11. The frame structure for the working vehicle as set forth in claim 10, wherein an outer end part of each of the rear transaxle casings is connected to a side surface of a corresponding one of the side frames through a second plate member.

12. The frame structure for the working vehicle as set forth in claim 1, wherein a stay is extended downward from each of the left and right transmission attachment members, wherein each of the left and right stays is formed with a bottom bent portion, and wherein the transmission is fixed onto the bottom bent portions of the left and right stays.

13. The frame structure for the working vehicle as set forth in claim 1, wherein a lever stand attached to at least one of the left and right side frames serves as a stay for mounting a rear fender.

* * * * *